(12) United States Patent
Tomioka

(10) Patent No.: US 7,492,527 B2
(45) Date of Patent: Feb. 17, 2009

(54) THREE-GROUP ZOOM LENS AND IMAGING DEVICE

(75) Inventor: Ryoko Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/015,380

(22) Filed: Jan. 16, 2008

(65) Prior Publication Data
US 2008/0198483 A1 Aug. 21, 2008

(30) Foreign Application Priority Data
Feb. 20, 2007 (JP) .......................... P2007-039289

(51) Int. Cl.
*G02B 15/14* (2006.01)
(52) U.S. Cl. ..................... 359/689; 359/683
(58) Field of Classification Search ................. 359/683, 359/689
See application file for complete search history.

(56) References Cited

U.S. PATENT DOCUMENTS 5,585,970 A * 12/1996 Shibayama .................. 359/686

FOREIGN PATENT DOCUMENTS

| JP | 2000-267009 A | 9/2000 |
| JP | 2005-285064 A | 10/2005 |
| JP | 2005-321744 A | 11/2005 |
| JP | 2007-193140 A | 8/2007 |

* cited by examiner

*Primary Examiner*—William C Choi
(74) *Attorney, Agent, or Firm*—Birch, Stewart, Kolasch & Birch, LLP

(57) ABSTRACT

In a three-group zoom lens having negative power, positive power, and positive power in order from an object side, a first lens group is built from a first negative lens and a second positive biconvex lens which is formed from a plastic material and which has at least one aspherical surface; a second lens group G2 is built from a positive, a negative cemented lens and a fifth lens L5 assuming a meniscus shape; and a third lens group is built from a sixth lens L6 which is a positive single lens. The zoom lens fulfills conditional expressions provided below:

$$3.2 < fg_2/fw \quad (1)$$
$$26 < v_1 - v_2 < 30 \quad (2)$$
$$D_1/fw < 0.75 \quad (3)$$

($fg_2$: a focal length of the second lens, fw: a focal length of an entire system achieved at a wide-angle end, $v_1$: Abbe number of the first lens, $v_2$: Abbe number of the second lens, and $D_1$: Axial distance from a lens surface most closely positioned to the object side to a lens surface most closely positioned to an image side in the first lens group).

10 Claims, 16 Drawing Sheets

EXAMPLE 1

EXAMPLE 1

FIG. 2
EXAMPLE 1
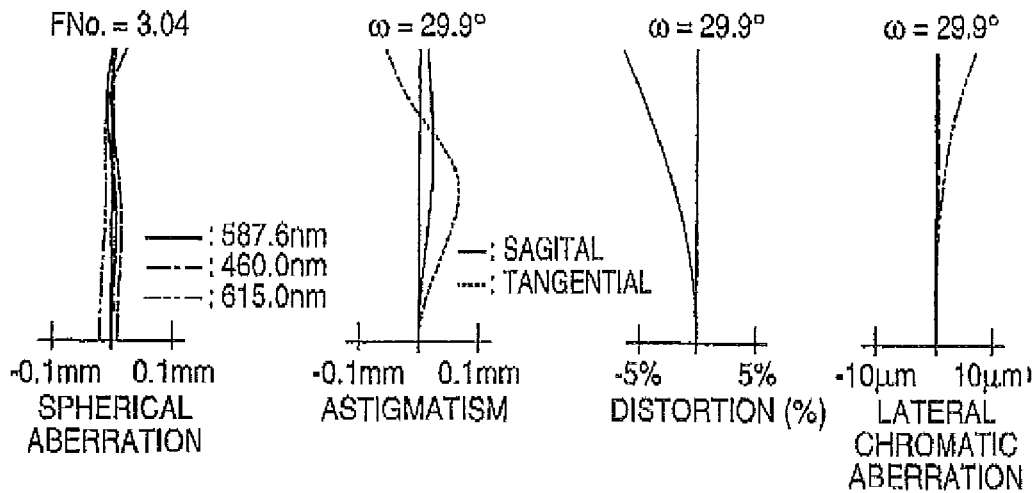
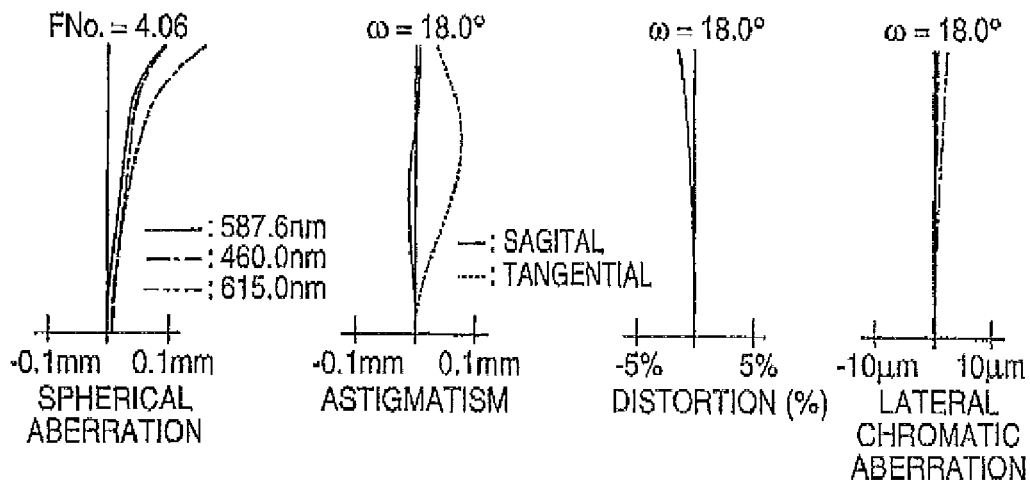
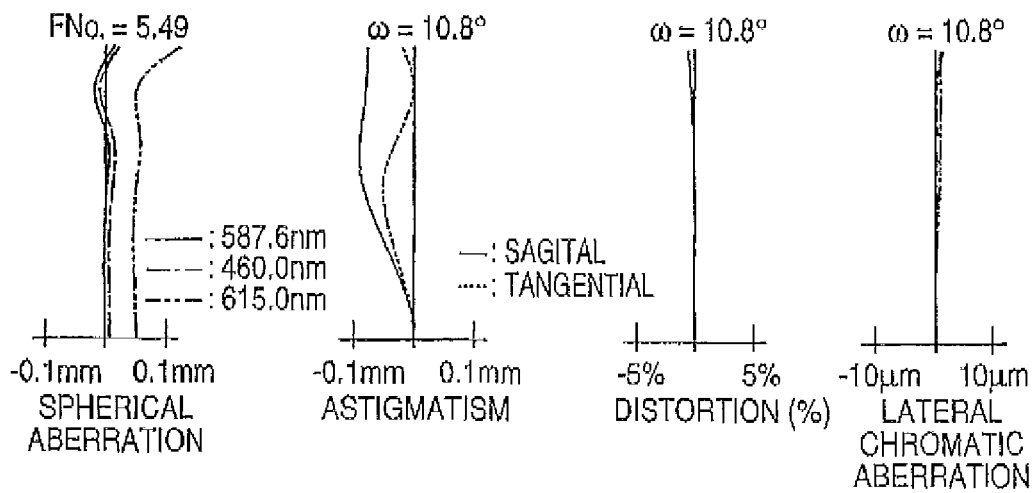

EXAMPLE 2

FIG. 4
EXAMPLE 2
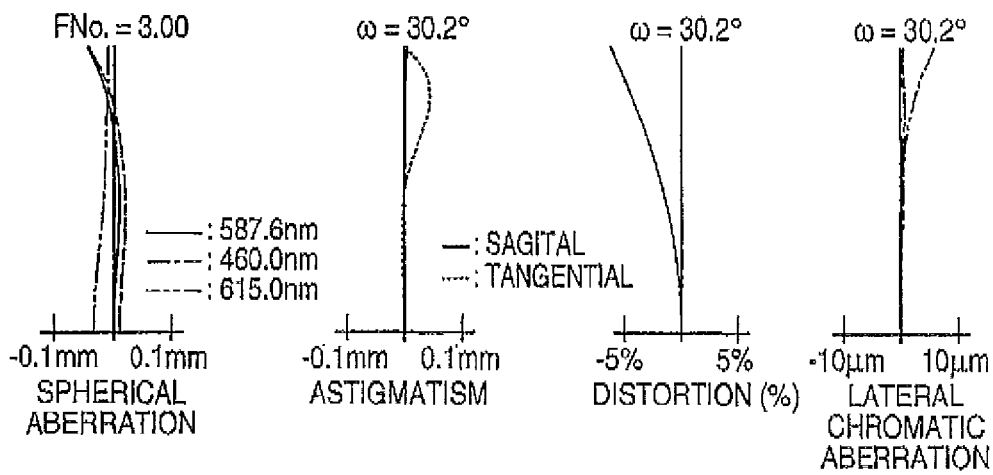
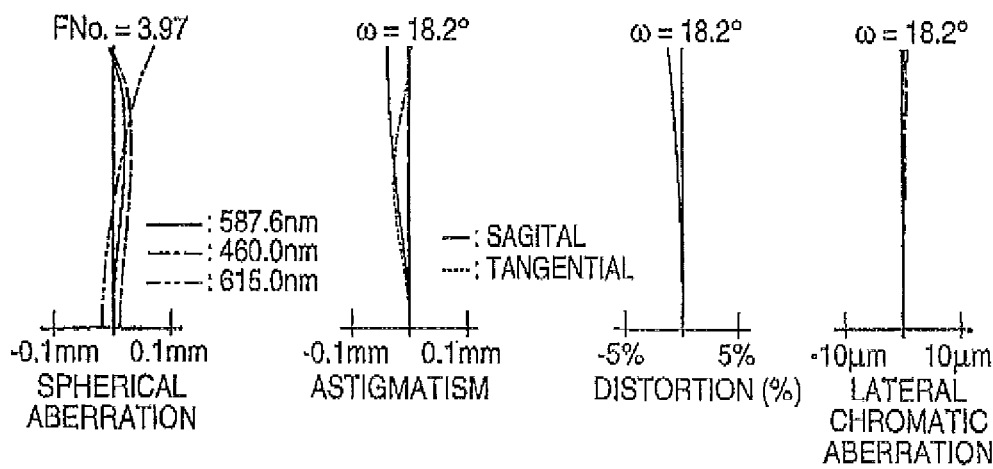
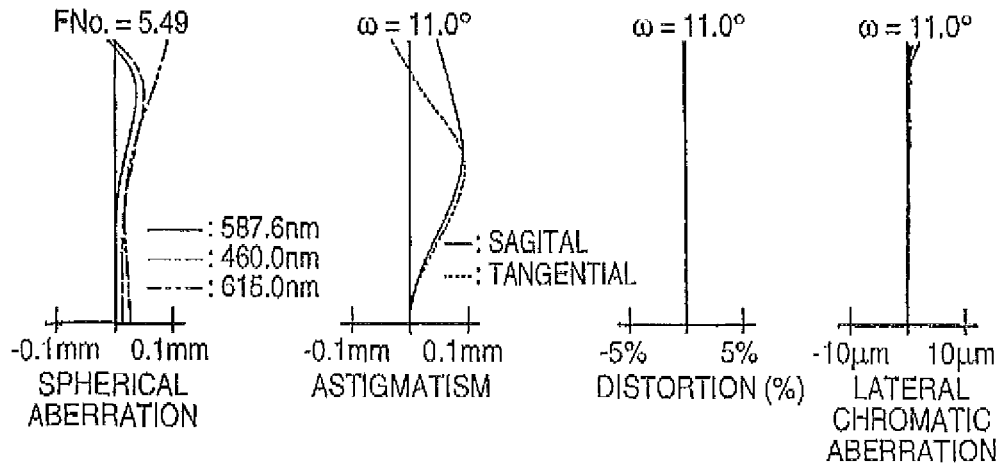

EXAMPLE 3

FIG. 6
EXAMPLE 3
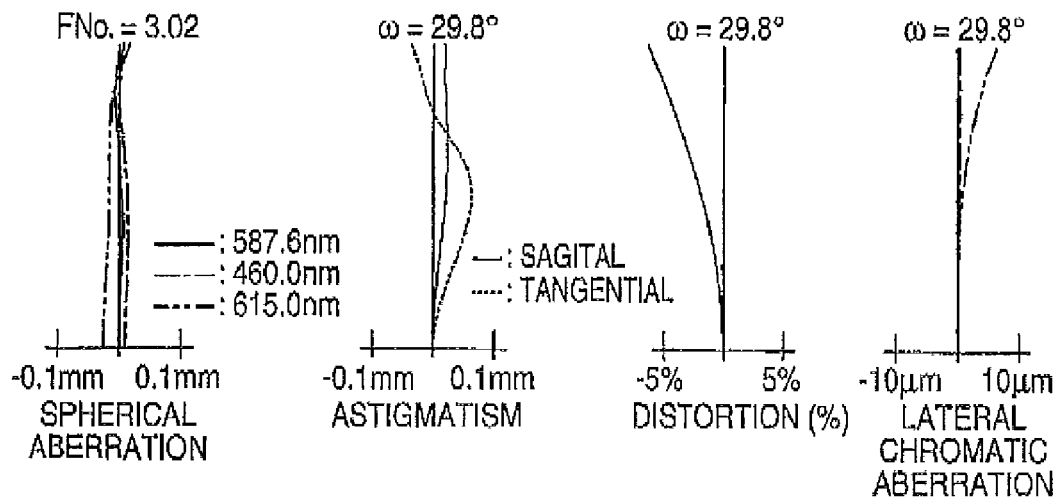
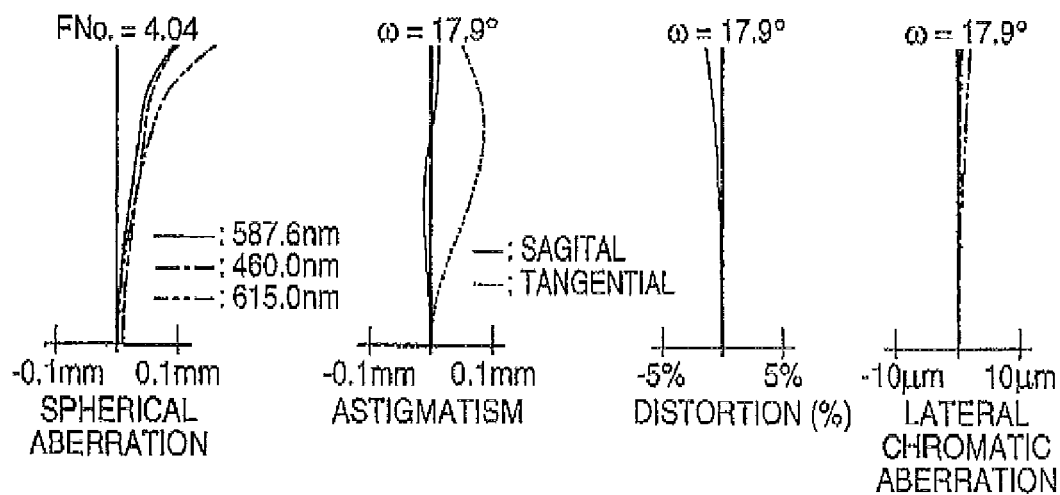
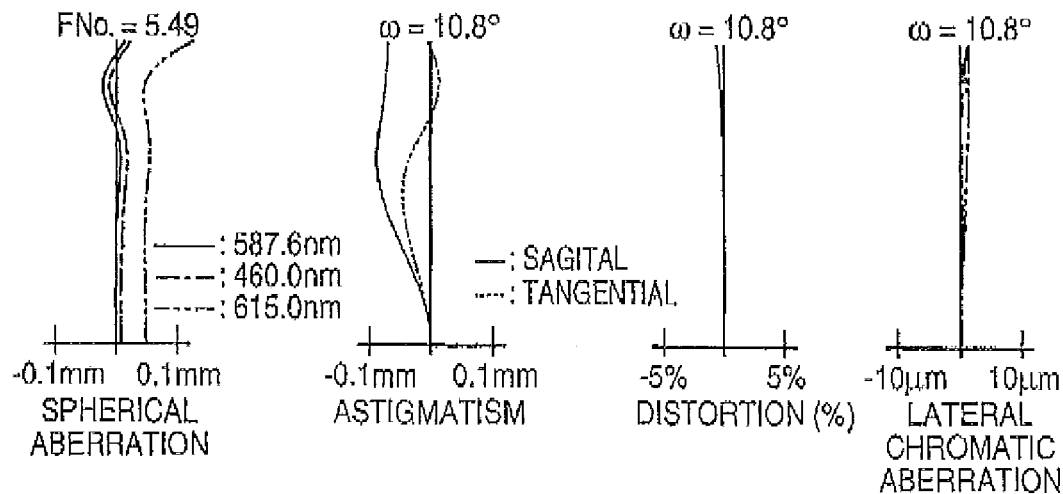

FIG. 8
EXAMPLE 4
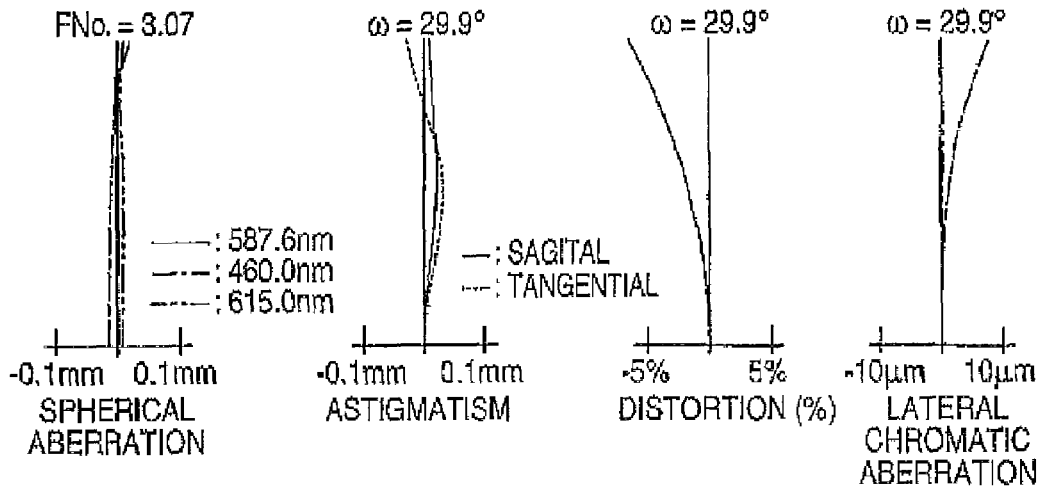
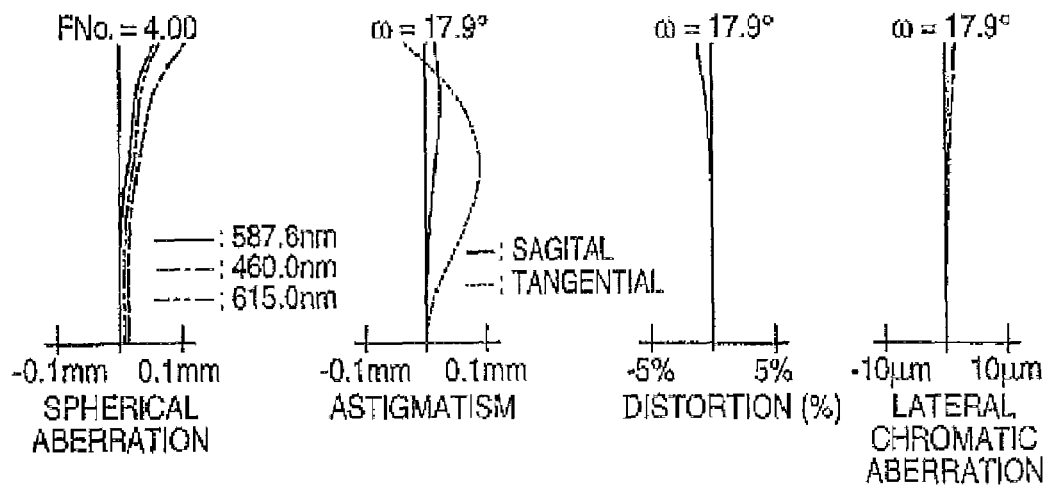
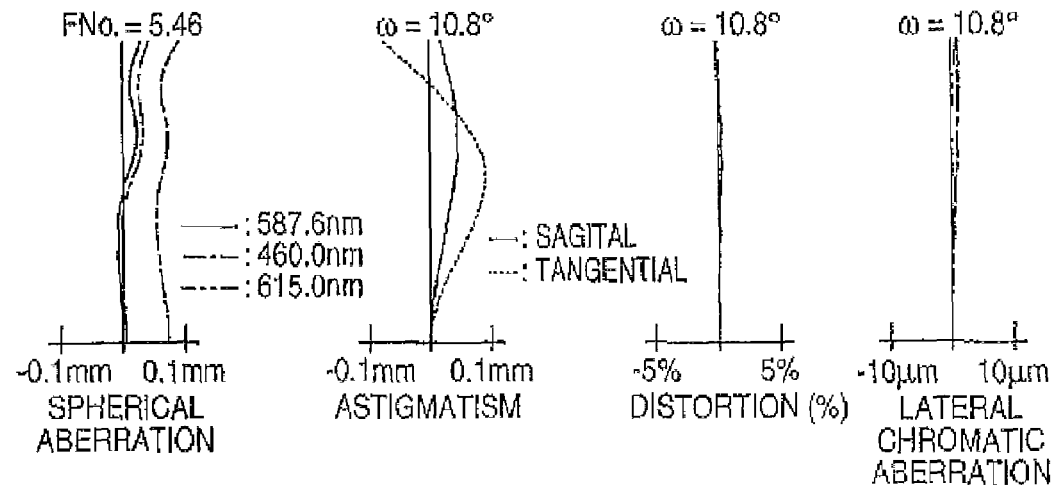

EXAMPLE 5

EXAMPLE 6

EXAMPLE 6

EXAMPLE 7

FIG. 14
EXAMPLE 7
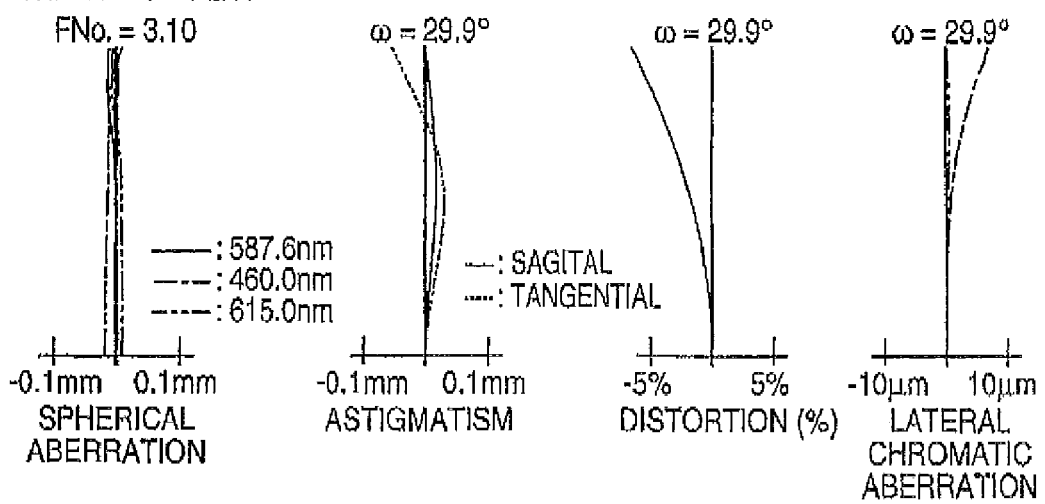
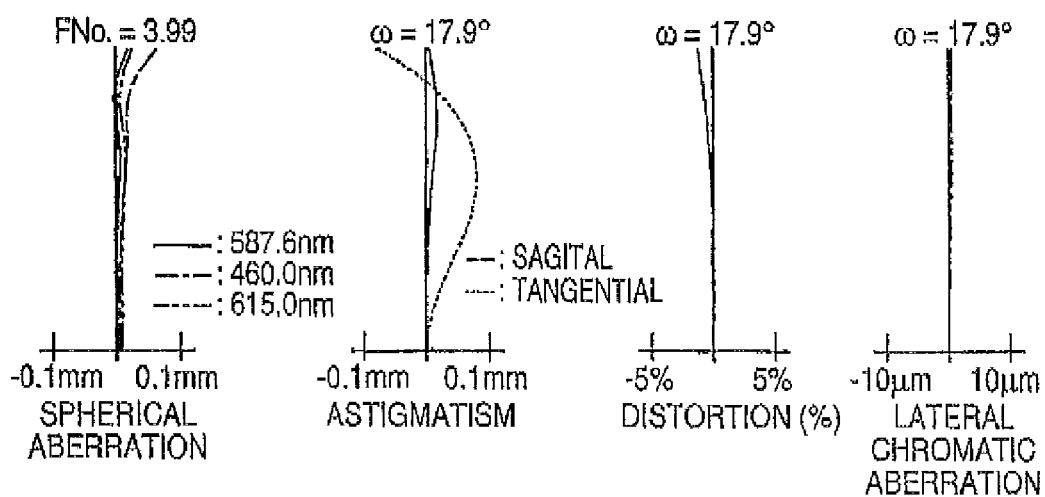
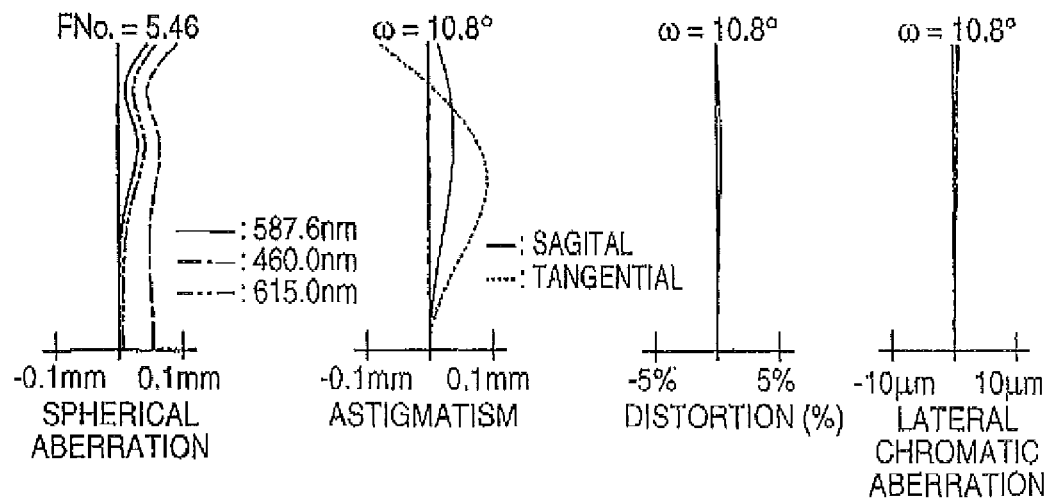

THREE-GROUP ZOOM LENS AND IMAGING DEVICE

BACKGROUND OF THE INVENTION

1. Field of the Invention

The present invention relates to a three-group zoom lens and an imaging device, and more particularly to a three-group zoom lens suitable for use in a digital camera, a video camera, and the like, using an imaging element such as a CCD (Charge-Coupled Device) or CMOS (Complementary Metal Oxide Semiconductor), as well as to an imaging device equipped with the three-group zoom lens.

2. Description of the Related Art

In recent years, digital cameras and video cameras become widespread rapidly. In addition to attaining miniaturization, higher image quality, and lower distortion, lenses provided in these cameras are desired to attain cost reduction as are lenses for common cameras. Moreover, in relation to these cameras, a demand exists for an optical zoom system capable of varying power without deterioration of image quality. Demands for zoom-lens-equipped cameras are growing year by year. In these cameras, autofocusing has gone mainstream, and faster focusing is desired.

An inner focusing system or a rear focusing system—which enables a reduction in the weight of a lens, uses a lens positioned closely to a camera main body, and is easy to drive—is frequently used as the focusing system of the zoom lens. In relation to the number of lens groups, a three-group configuration is considered to be more desirable than a two-grouped configuration, because miniaturization and superior correction of aberrations can be accomplished. In JP-A-2007-193140, a zoom lens of three-group configuration which can be applied to a digital camera is proposed.

Moreover, JP-A-2005-321744 describes a compact three-group zoom lens that has accomplished a compact configuration by effective use of aspherical lenses. JP-A-2005-258064 and JP-A-2000-267009 describe zoom lenses which use a plurality of plastic lenses in order to achieve cost reduction and which exhibit a nearly-three-times zoom ratio.

As mentioned above, proliferation of the digital cameras, and the like, is remarkable, and demands for miniaturization, higher performance, and cost reduction of a zoom lens provided in these cameras becomes sterner year by year.

The zoom lens described in JP-A-2005-321744 is very compact, but glass is used for a material of an aspherical lens, which makes the lens expensive and insufficient in terms of cost reduction.

In relation to the zoom lenses described in JP-A-2005-258064 and JP-A-2000-267009, an attempt is made to achieve cost reduction and a reduction in weight by use of a plurality of plastic lenses. However, each of the lens groups has a great thickness, and hence the entire length of a lens system achieved in an optical direction thereof becomes longer when the lens system is retractably housed in a camera main body. Thus, the zoom lenses are insufficient in terms of miniaturization.

SUMMARY OF THE INVENTION

The present invention has been conceived in view of the circumstances and aims at providing a three-group zoom lens which enables making of an attempt to accomplish miniaturization and cost reduction while maintaining superior optical performance and an imaging device equipped with the three-group zoom lens.

The present invention provides a three-group zoom lens comprising, in order from an object side:

a first lens group having a negative refractive power;
a second lens group having a positive refractive power; and
a third lens group having a positive refractive power,
wherein the three-group zoom lens varies power by changing spacing among the respective lens groups,
wherein the first lens group comprises:
a first lens having a negative refractive power; and
a second lens that is formed from a plastic material, has a biconvex shape, has at least one surface of an aspherical shape and has a positive refractive power,
wherein the second lens group comprises:
a cemented lens formed from a third lens having a positive refractive power and a fourth lens having a negative refractive power; and
a fifth lens having a meniscus shape whose convex surface is oriented to the object side,
wherein the third lens group comprises a sixth lens having a positive refractive power, and
wherein conditional expressions (1) through (3) provided below are fulfilled:

$$3.2 < fg_2/fw \tag{1}$$

$$26 < v_1 - v_2 < 30 \tag{2}$$

$$D_1/fw < 0.75 \tag{3}, \text{where}$$

$fg_2$: a focal length of the second lens
fw: a focal length of the three-group lens achieved at a wide-angle end
$v_1$: Abbe number of the first lens
$v_2$: Abbe number of the second lens
$D_1$: Axial distance from a lens surface most closely positioned to the object side to a lens surface most closely positioned to an image side in the first lens group.

In the three-group zoom lens of the present invention, the second lens of the first lens group is embodied as an aspherical plastic lens assuming a biconvex shape. In normal times, the first lens group becomes greater than the other lens groups in terms of the outer diameter of a lens. For this reason, cost can be significantly reduced, so long as a plastic lens is used for the first lens group. Moreover, an aspherical lens can be produced inexpensively from a plastic material rather than from a glass material. The aspherical lens involves many parameters and is advantageous to correction of aberrations. As a result of the second lens being formed into a biconvex shape, sufficient power can be acquired by use of plastic which is lower than glass in terms of a refractive index. Specifically, in the present invention an attempt is made to achieve cost reduction and yield a superior effect of correction of aberrations by means of the second lens of the foregoing configuration.

The three-group zoom lens of the present invention makes well corrections on various aberrations by selection of the shapes and optical materials of the respective lenses as mentioned above, to thus ensure high optical performance. The zoom lens well maintains optical performance even in the case of occurrence of environmental fluctuations by means of fulfilling the conditional expression (1); well maintains a chromatic aberration by means of fulfilling the conditional expression (2); and reduces the thickness of the first lens group by means of fulfilling the conditional expression (3), thereby shortening the entire length of the lens system achieved when the lens system is retractably housed in the imaging device and achieving a reduction in size.

In the three-group zoom lens of the present invention, the second lens preferably fulfills conditional expressions (4) and (5) provided below:

$$Nd_2 > 1.6 \quad (4)$$

$$v_2 < 30.0 \quad (5)$$

where $Nd_2$ is a refractive index of the second lens.

Moreover, the second lens group preferably fulfills a conditional expression (6) provided below:

$$D_2/fw < 0.85 \quad (6)$$

where $D_2$ is an axial distance from a lens surface most closely positioned to the object side to a lens surface most closely positioned to the image side in the second lens group.

Further, the sixth lens preferably is formed from a plastic material, to thus fulfill a conditional expression (7) provided below:

$$3.0 < f_3/fw \quad (7)$$

where $f_3$ is a focal length of the third lens group.

Moreover, focusing is performed by means of moving only the third lens group in a direction of an optical axis, and a conditional expression (8) provided below is preferably fulfilled:

$$f_3/fw < 5.5 \quad (8).$$

All of the conditional expressions (1) through (8) are determined by means of taking, as a reference wavelength, a d-line (a wavelength of 587.6 nm). The d-line is taken as a reference wavelength in the specification unless otherwise specifically noted.

An imaging device of the present invention is characterized by comprising:

the above-mentioned three-group zoom lens; and an imaging element for capturing an image of a subject formed by means of the three-group zoom lens.

BRIEF DESCRIPTION OF THE DRAWINGS

FIG. 2 is aberration diagrams of the three-group zoom lens of Example 1 of the present invention;

FIG. 4 is aberration diagrams of the three-group zoom lens of Example 2 of the present invention;

FIG. 6 is aberration diagrams of the three-group zoom lens of Example 3 of the present invention;

FIG. 8 is aberration diagrams of the three-group zoom lens of Example 4 of the present invention;

FIG. 14 is aberration diagrams of the three-group zoom lens of Example 7 of the present invention;

DETAILED DESCRIPTION OF THE INVENTION

Figure 1:
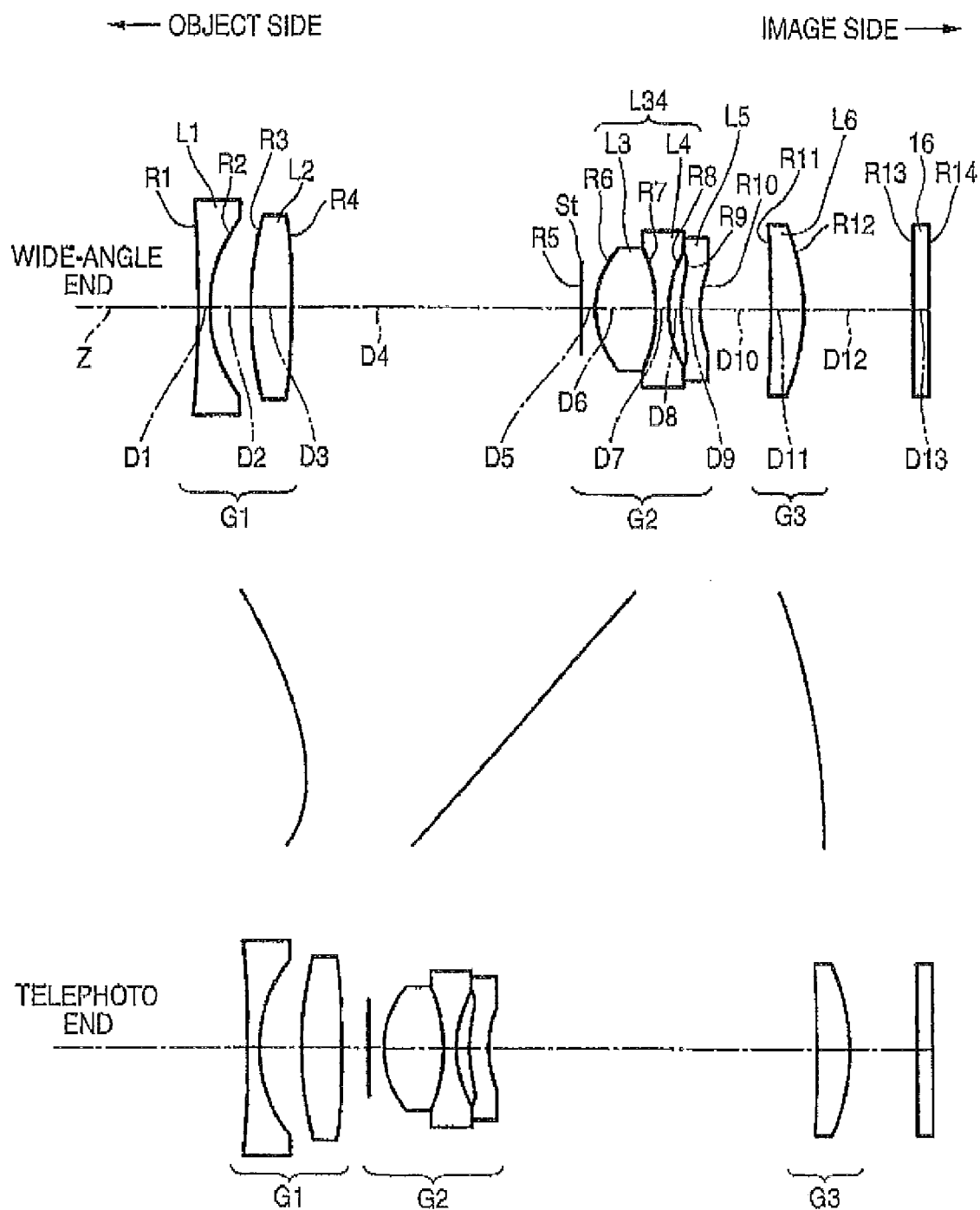
FIG. 1 is a cross-sectional profile showing a lens configuration of a three-group zoom lens of Example 1 of the present invention.

An embodiment of a three-group zoom lens of the present invention and an embodiment of an imaging device equipped with the three-group zoom lens will be described in detail hereinafter by reference to the drawings. The three-group zoom lens of the present embodiment can be appropriately used for an imaging device, such as a digital camera and a video camera, using an imaging element; for example, a CCD and a CMOS. FIG. 1 shows a cross-sectional profile of an optical system which is an example configuration of a three-group zoom lens according to an embodiment of the present invention. An upper row of FIG. 1 shows a cross-sectional profile of an optical system achieved at a wide-angle end; a lower row of the same shows a cross-sectional profile of the optical system achieved at a telephoto end; and a middle row of the same shows trails of respective lens groups resultant from movement of the lens groups from the wide-angle end to the telephoto end. The example configurations shown in FIG. 1 correspond to a lens configuration of Example 1 to be described later.

The three-group zoom lens of the present embodiment has a nearly-three-times variable power ratio. As shown in FIG. 1, a first lens group G1 having a negative refractive power, a second lens group C2 having a positive refractive power, and a third lens group G3 having a positive refractive power are arranged along an optical axis Z in order from an object side. Power is varied by changing spacing among the respective lens groups.

FIG. 1 also illustrates an imaging element 16 for capturing an image of a subject formed by the three-group zoom lens. The imaging element 16 has cover glass for protection purpose on an object side of an imaging surface and is arranged such that a position at which light having passed through the three-group zoom lens and the cover glass forms an image coincides with the position of the imaging surface of the imaging element 16. The cover glass for protection purpose may also have the function of an infrared-radiation cutoff filter, a low-pass filter, or the like.

The first lens group G1 is built from a first lens L1 having a negative refractive power; and a second lens L2 which in formed from a plastic material, which assumes a biconvex shape, and which has at least one surface of an aspherical shape and has a positive refractive power. The second lens group G2 is built from an aperture diaphragm St; a cemented lens L34 formed from a third lens L3 having a positive refractive power and a fourth lens L4 having a negative refractive power, and a fifth lens L5 whose convex surface is oriented toward the object side and which assumes a meniscus shape. The third lens group G3 is built from a sixth lens L6 which is a single lens having a positive refractive power.

The first lens group G1 having the above configuration acts so as to properly correct a field curvature and distortion.

Since the first lens group G1 positioned most closely to the object side becomes greater than the other lens groups in terms of an outer diameter of the lens, great effectiveness of cost reduction is yielded by use of a plastic material. However, plastic is inferior to glass in terms of weather resistance. Therefore, when plastic is used for the lens positioned most closely to the object side, attaching the cover glass, or the like, to a position much closer to the object side is preferable, which adds to cost correspondingly. Accordingly, in the three-group zoom lens of Example 1 shown in FIG. 1, the first lens L1 positioned most closely to the object side is formed from a glass material, and the second lens L2 is formed from a plastic material, thereby resolving the problem of weather resistance and accomplishing cost reduction.

The second lens L2 of the positive lens acts so as to reduce a refraction angle of a light beam diverged by the first lens L1 corresponding to a negative lens, thereby preventing occurrence of various aberrations. Plastic is generally lower than glass in terms of a refractive index, and hence a plastic lens becomes smaller in power than a glass lens of the same shape. However, in the three-group zoom lens, the second lens L2 is formed so as to assume a biconvex shape, so that sufficient power can be ensured. Moreover, at least one surface of the second lens L2 is formed into an aspherical shape, thereby properly correcting the aberrations and contributing to a reduction in the number of lenses. Moreover, since an aspherical lens can be inexpensively manufactured from a plastic lens rather than from a glass material, a superior advantage can be yielded in terms of cost reduction.

In the second lens group G2, a chromatic aberration is properly corrected by the cemented lens L34 consisting of the positive third lens L3 located in the vicinity of the aperture diaphragm St and the negative fourth lens L4. Further, various aberrations can be properly corrected by means of the fifth lens L5 whose convex surface is oriented toward the object side and which assumes a meniscus shape.

In particular, as in the case of Example shown in FIG. 1, when the third lens T3 is built from a biconvex lens and when the fourth lens L4 is built from a biconcave lens, the third lens L3 can be imparted with strong positive power, and the fourth lens L4 can be imparted with strong negative power. Hence, the lenses become advantageous in terms of correction of aberrations and can contribute to a reduction in the number of lenses.

In the three-group zoom lens consisting of a negative lens group, a positive lens group, and a positive lens group as mentioned in connection with the present embodiment, the aperture diaphragm is frequently positioned between the first lens group and the second lens group or in the second lens group. Since a beam height of an axial beam becomes higher as the proximity to the aperture diaphragm increases, fluctuations in spherical aberration attributable to decentration become greater. In the present three-group zoom lens, the third lens L3 located in the vicinity of the aperture diaphragm St and the fourth lens L4 are formed as a cemented lens, and hence relative decentration between the third lens L3 and the fourth lens L4 is reduced, thereby dampen fluctuations in spherical aberration.

Of the lens groups, the third lens group G3 located most closely to the image side becomes most closely to the camera main body when the three-group zoom lens is attached to the camera, and hence actuation of the third lens group is easier than actuation of the other lens groups. Therefore, it is preferable to perform focusing by moving only the third lens group G3 in the axial direction. In particular, in the three-group zoom lens, the third lens group G3 is formed from the sixth lens L6 that is a single lens. Therefore, load imposed on a drive system can be lightened, so long as the sixth lens L6 is used as a focusing lens.

Forming the sixth lens L6 from plastic is more preferable than glass, because plastic is lighter than glass. In this case, cost reduction can be accomplished. When the third lens group G3 performs focusing, the weight of the focusing lens can be reduced, thereby contributing speed-up of focusing.

The present three-group zoom lens fulfills the conditional expressions (1) through (3) provided below.

$$3.2 < fg_2/fw \tag{1}$$

$$26 < v_1 - v_2 < 30 \tag{2}$$

$$D_1/fw < 0.75 \tag{3}$$

where $fg_2$: a focal length of the second lens $fw$: a focal length of the three-group zoom lens achieved at a wide-angle end $v_1$: Abbe number of the first lens $v_2$: Abbe number of the second lens $D_1$: Axial distance from a lens surface most closely position to the object side to a lens surface most closely position to an image side in the first lens group.

The conditional expression (1) is an expression pertaining to a ratio of power of the second lens L2 to power of the entire system. Since the second lens L2 uses, as a material, plastic which is sensitive to fluctuations in environment, such as a temperature change, when compared with glass. When the power of the second lens L2 becomes great so as to cross the lower limit the conditional expression (1), influence on the optical performance of the entirety imposed by the second lens L2 becomes greater, and fluctuations in optical performance become greater at the time of occurrence of fluctuations in the environment.

The conditional expression (2) relates to Abbe numbers of lenses constituting the first lens group G1. Materials satisfying the conditional expression (2) are selected from plastic materials suitable for use as optical materials. As a result, even when plastic is used for the second lens L2, a chromatic aberration can be corrected well.

The conditional expression (3) relates to the thickness of the first lens group G1. A reduction in the thickness of the lens system and shortening of the entire length of the optical system achieved at the time of retractable housing of the optical system can be accomplished by fulfilling the conditional expression (3), thereby contributing to miniaturization of the zoom lens.

In the three-group zoom lens of the present embodiment, the second lens L2 preferably fulfills the conditional expressions (4) and (5) provided below:

$$Nd_2 > 1.6 \tag{4}$$

$$v_2 < 30.0 \tag{5}$$

where $Nd_2$ is a refractive index of the second lens.

The conditional expression (4) relates to a refractive index of the second lens L2. A radius of curvature of the second lens L2 can be increased by satisfaction off the conditional expression (4), so that the amount of aberration can be reduced.

The conditional expression (5) relates to Abbe number of the second lens L2. When plastic is used for the second lens L2, a chromatic aberration can be corrected well by satisfaction of the conditional expression (5).

In the three-group zoom lens of the present embodiment, the second lens group G2 preferably fulfills the conditional expression (6) provided below:

$$D_2/fw<0.85 \quad (6)$$

where $D_2$ is ah axial distance from a lens surface most closely positioned to the object side to a lens surface most closely positioned to the image side in the second lens group.

The conditional expression (6) relates to the thickness of the second lens group G2. Fulfilling the conditional expression (6) results in a contribution to further miniaturization to be accomplished at the time of retractable housing of the optical system.

The three-group zoom lens described in JP-A-2007-193140, which is mentioned in connection with the Background Art, does not fulfill the conditional expression (6). Hence, the three-group zoom lens of the present embodiment fulfilling the conditional expression (6) can further miniaturized when compared with that described in JP-A-2007-193140.

In the three-group zoom lens of the present embodiment, the lens constituting the third lens group G3 is preferably formed from a plastic material, to thus fulfill the conditional expression (7):

$$3.0<f_3/fw \quad (7)$$

where $f_3$ is a focal length of the third lens group.

The conditional expression (7) relates to distribution of power; namely, a ratio of power of the third lens group G3 to power of the entire system. In a case where the power of the third lens group G3 becomes excessively great so as to cross the lower limit of the conditional expression (7), variations in performance induced by environmental fluctuations, such as a temperature change, unfavorably become great when the third lens group G3 is formed from plastic.

In the three-group zoom lens of the present embodiment, focusing is preferably performed by actuating only the third lens group G3 in the axial direction, to thus fulfill the conditional expression (8) provided below:

$$f_3/fw<5.5 \quad (8).$$

The conditional expression (8) relates to power distribution as in the case of the conditional expression (7). When the power of the third lens group G3 becomes excessively small so as to surpass the upper limit of the conditional expression (8), the amount of focusing movement becomes excessively large when the third lens group G3 is used as a focusing lens, whereupon fluctuations in aberration achieved during focusing become unfavorably great.

Specific numerical Examples of the three-group zoom lens of the present invention will now be described.

EXAMPLE 1

Table 1 shows values of specifications of a three-group zoom lens of Example 1. Reference symbols of Table 1 include the aperture diaphragm St and the imaging element 16, as well. In Table 1, Si designates the $i^{th}$ surface number ("i"=1 through 14) which gradually increases toward the image side while the surface of a constituent element located most closely to the object side is taken as the first. Ri designates a radius of curvature of the $i^{th}$ surface ("i"=1 through 14) Di designates on-axis surface spacing between the $i^{th}$ surface ("i"=1 through 13) and the i+1$^{th}$ surface along the optical axis Z. Ndj designates a refractive index of the $j^{th}$ (j=1 through 7) optical element (a lens or cover glass of the imaging element 16)—whose number gradually increases toward the image side while the lens positioned most closely to the object side is taken as the first—achieved at a d-line (587.6 nm); and vdj designates an Abbe number of the $j^{th}$ optical element achieved at the d-line.

In Table 1, the unit of the radius of curvature and the unit of on-axis surface spacing are mm. The radius of curvature assumes a positive sign when a convex surface is oriented toward the object side and assumes a negative sign when the convex surface is oriented toward the image side. The top row of Table 1 shows a value of a focal length "f" (mm), a value of an F/number, and a value of a full field angle 2ω (degree) which are achieved at each of the wide-angle end position and the telephoto end position.

In Table 1, a surface whose surface number is assigned an asterisk are an aspherical surface. Respective aspherical surfaces are expressed by the following aspherical expression.

$$Z = \frac{Y^2/R}{1+(1-KA\cdot Y^2/R^2)^{1/2}} + \sum_{i=3}^{20} AiY^i$$

Z: Depth of an aspherical surface
Y: Height
R: Paraxial radius of curvature
KA: Eccentricity
Ai: Aspherical coefficient (i=3 to 20)

Table 2 shows values of coefficients KA and A3 to A20 of the aspherical expression with regard to each of aspherical surfaces. In relation to a portion of aspherical surfaces of Example 1, an aspherical shape is defined by use of not only an even-numbered-order term but also an odd-numbered-order term. As a result, a parameter determining an aspherical surface is increased, thereby enabling independent determination of the shape of a center area including an optical axis of an aspherical surface and the shape of a peripheral area. Aberrations in the center area and those in the peripheral area can be corrected well.

In Table 1, spacing changes because power is varied. Spacing between the first lens group G1 and the second lens group G2, spacing between the second lens group G2 and the third lens group G3, and spacing between the third lens group G3 and the imaging element 16 axe described as a change d1, a change d2, and a change d3. Table 3 shows values of d1, values of d2, and values d3, which are achieved at the wide-angle end, an intermediate position, and the telephoto end, along with focal lengths.

Meanings of the symbols provided in the respective tables described above shall likewise apply to symbols in tables of other examples to be described later.

TABLE 1

Example 1
f = 6.83~19.30, FNo. = 3.0~5.5, 2ω = 59.8~21.6

| Si | Ri | Di | Ndj | vdj |
|---|---|---|---|---|
| 1 | −70.5114 | 0.60 | 1.72916 | 54.7 |
| 2 | 7.6908 | 2.15 | | |
| 3* | 19.6535 | 2.06 | 1.60595 | 27.0 |
| 4* | −94.0421 | Change d1 | | |
| 5 (aperture diaphragm) | ∞ | 0.75 | | |
| 6 | 5.1138 | 3.06 | 1.75500 | 52.3 |
| 7 | −8.2267 | 0.65 | 1.68893 | 31.1 |

TABLE 1-continued

Example 1
f = 6.83~19.30, FNo. = 3.0~5.5, 2ω = 59.8~21.6

| Si | Ri | Di | Ndj | vdj |
|---|---|---|---|---|
| 8 | 6.283 | 0.65 | | |
| 9* | 5.8776 | 1.00 | 1.50957 | 56.5 |
| 10* | 5.5148 | Change d2 | | |
| 11* | −78.9923 | 1.67 | 1.50957 | 56.5 |
| 12* | −10.9826 | Change d3 | | |
| 13 | ∞ | 0.80 | 1.51680 | 64.2 |
| 14 (image plane) | ∞ | 0.00 | | |

TABLE 2

Example 1, aspherical coefficients

| Si | KA | A3 | A4 | A5 | A6 |
|---|---|---|---|---|---|
| 3 | −0.8589195 | 9.9200237E−04 | −1.1718007E−03 | 6.9809999E−04 | −1.8641815E−04 |
| 4 | −0.0122034 | 3.0079491E−04 | −3.4914436E−04 | −1.7950828E−04 | 2.3788789E−04 |
| 9 | −0.1173292 | −6.1328288E−03 | 4.8599869E−03 | −5.1564517E−03 | 9.8585193E−04 |
| 10 | −9.8416737 | −6.7942913E−03 | 1.7489183E−02 | −7.5745733E−03 | 1.0929486E−03 |

| Si | A7 | A8 | A9 | A10 | A11 |
|---|---|---|---|---|---|
| 3 | 1.1782635E−05 | 1.7745999E−06 | 7.1735187E−09 | 1.0281543E−08 | −7.4877439E−09 |
| 4 | −1.0655061E−04 | 1.5412155E−05 | 8.4969415E−07 | −1.7602443E−07 | −4.2656598E−08 |
| 9 | −5.3451122E−05 | −2.1062599E−05 | −1.8995806E−06 | −1.3233917E−07 | −1.3108537E−08 |
| 10 | 2.2887125E−06 | −2.0108237E−06 | 3.2153362E−08 | −5.0164474E−08 | −3.6170659E−09 |

| Si | A12 | A13 | A14 | A15 | A16 |
|---|---|---|---|---|---|
| 3 | 1.6667367E−10 | −5.4749035E−11 | −6.7630843E−13 | −9.4476596E−14 | −2.0694399E−14 |
| 4 | 4.9264419E−09 | −1.2441431E−11 | 1.2162671E−11 | 6.5674969E−14 | −1.1933252E−14 |
| 9 | −3.2570581E−09 | | | | |
| 10 | −3.1413351E−09 | | | | |

| Si | A17 | A18 | A19 | A20 |
|---|---|---|---|---|
| 3 | −4.9296182E−16 | 5.8254199E−16 | 3.0650554E−17 | 3.8549726E−19 |
| 4 | 6.0897545E−16 | 3.5773570E−17 | 6.7809599E−17 | −8.1737393E−19 |

| Si | KA | A4 | A6 | A8 | A10 |
|---|---|---|---|---|---|
| 11 | 0.9945176 | −6.3248398E−05 | 1.9636766E−06 | −1.9116770E−10 | −3.0322185E−14 |
| 12 | 1.5249337 | 1.7145839E−04 | −6.4949302E−07 | 5.7299236E−11 | 1.0234635E−14 |

TABLE 3

Example 1, spacing among groups

| Focal length | d1 | d2 | d3 |
|---|---|---|---|
| 6.83 | 15.05 | 3.68 | 5.68 |
| 11.48 | 7.21 | 10.00 | 3.86 |
| 19.30 | 1.41 | 16.92 | 3.48 |

The lens configuration diagram for Example 1 is shown in FIG. 1 as mentioned previously. In FIG. 1, an aperture diaphragm St does not show the shape or size of the aperture diaphragm but shows the position of the same along the optical axis Z. In FIG. 1, reference symbol Ri (i=1 through 14) corresponds to Ri in Table 1; and Di (i=1 through 14) corresponds to Di.

In the three-group zoom lens of Example 1, the first lens L1 is formed from a glass material, and the second lens L2, the fifth lens L5, and the sixth lens L6 are formed from a plastic material.

FIG. 2 shows aberration diagrams pertaining to spherical aberration astigmatism, distortion aberration (distortion), and lateral chromatic aberration of the three-group zoom lens of Example 1. Respective aberration diagrams show aberration achieved while a wavelength of 587.6 nm (a d-line) is taken as a reference wavelength. A spherical aberration diagram and a lateral chromatic aberration diagram also show aberrations acquired at a wavelength of 460.0 nm and those acquired at a wavelength of 615.0 nm. FNo. assigned to the vertical axis of the spherical aberration diagram shows an F/number, and reference symbol ω of the vertical axes of the other aberration diagrams designates a half field angle. Meanings of the above-described reference symbols also apply likewise to drawings of other examples to be described later. FIG. 2 shows that aberrations in the three-group zoom lens of Example 1 are well corrected over the entirety of a zoom area.

EXAMPLE 2

Figure 3:
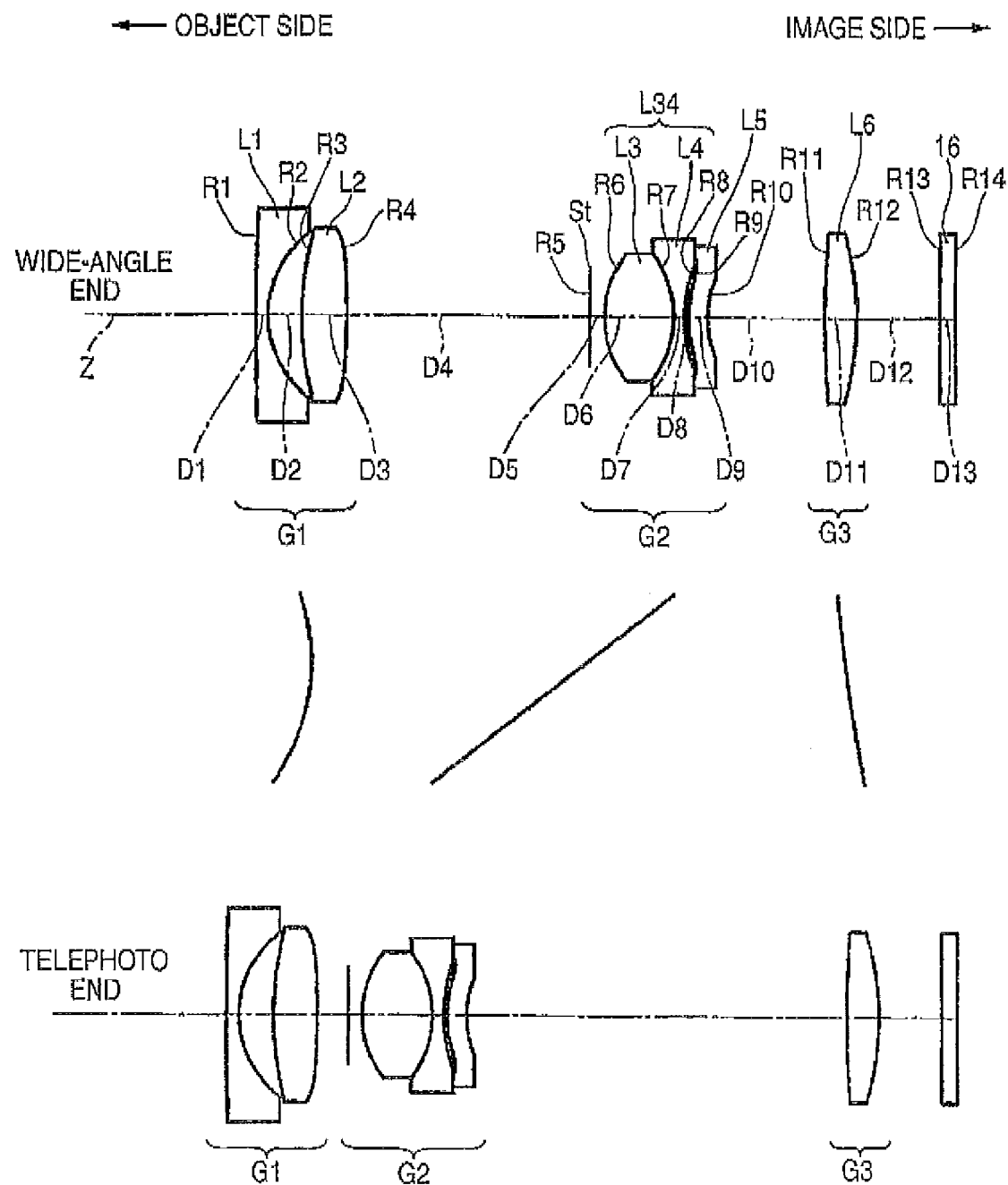
FIG. 3 is a cross-sectional profile showing a lens configuration of a three-group zoom lens of Example 2 of the present invention.

Table 4 shows values of specifications of a three-group zoom lens of Example 2; Table 5 shows coefficients for an aspherical equation in connection with respective aspherical surfaces; and Table 6 shows spacing among groups achieved at the time of variation of power. FIG. 3 shows a lens configuration diagram of a three-group zoom lens of Example 2; and FIG. 4 shows aberration diagrams. In FIG. 3, reference symbols Ri and Di correspond to Ri and Di in Table 4.

TABLE 4

Example 2
f = 6.71~18.98, FNo. = 3.0~5.5, 2ω = 60.4~22.0

| Si | Ri | Di | Ndj | vdj |
|---|---|---|---|---|
| 1 | 166.1400 | 0.65 | 1.72916 | 54.7 |
| 2 | 5.4901 | 1.80 | | |
| 3* | 17.1764 | 2.30 | 1.60595 | 27.0 |
| 4* | −76.1422 | Change d1 | | |
| 5 (aperture diaphragm) | ∞ | 0.75 | | |
| 6 | 5.6140 | 3.58 | 1.72916 | 54.7 |
| 7 | −5.6140 | 0.56 | 1.64769 | 33.8 |
| 8 | 7.8262 | 0.21 | | |
| 9* | 5.8403 | 1.00 | 1.50957 | 56.5 |
| 10* | 5.4999 | Change d2 | | |
| 11* | 50.2290 | 1.67 | 1.50957 | 56.5 |
| 12* | −16.0003 | Change d3 | | |
| 13 | ∞ | 0.80 | 1.5168 | 64.2 |
| 14 (image plane) | ∞ | 0 | | |

TABLE 5

Example 2, aspherical coefficients

| Si | KA | A3 | A4 | A5 | A6 |
|---|---|---|---|---|---|
| 3 | 0.1333363 | −1.6624692E−03 | 2.5046634E−03 | −1.7538681E−03 | 6.4227734E−04 |
| 4 | −0.0051295 | −2.0215139E−03 | 2.3768202E−03 | −1.9735904E−03 | 6.8120956E−04 |
| 9 | −5.9307238 | −2.4590303E−03 | 5.3485388E−03 | −1.9734172E−03 | 4.3976524E−05 |
| 10 | 2.0526210 | 1.5892197E03 | 1.5889345E03 | 2.4767033E04 | 3.0173550E04 |

| Si | A7 | A8 | A9 | A10 | A11 |
|---|---|---|---|---|---|
| 3 | −1.0015681E−04 | −1.1601145E−06 | 1.3007514E−06 | 1.0630317E−07 | −1.3529922E−08 |
| 4 | −9.4943324E−05 | −4.0576553E−06 | 1.0912268E−06 | 2.1945471E−07 | −1.1826770E−08 |
| 9 | −4.1836206E−05 | −8.0357505E−06 | −4.6900047E−07 | −3.4432326E−08 | −7.2263883E−09 |
| 10 | 4.6343754E−06 | 2.0648711E−06 | 1.2360647E−07 | −1.4848734E−08 | −9.3773911E−10 |

| Si | A12 | A13 | A14 |
|---|---|---|---|
| 3 | −2.8327456E−09 | −1.1411866E−11 | −7.7403190E−12 |
| 4 | −4.6294929E−09 | 1.3681448E−12 | −9.8852321E−12 |
| 9 | −2.4888194E−09 | | |
| 10 | −9.9697559E−10 | | |

| Si | KA | A4 | A6 | A8 | A10 |
|---|---|---|---|---|---|
| 11 | 0.9922447 | −6.4177511E−05 | 2.5472634E−08 | 5.5462478E−12 | 3.5424740E−16 |
| 12 | 1.0788635 | 1.0447770E−05 | −2.5249742E−08 | −5.3376507E−12 | −3.4901265E−16 |

TABLE 6

Example 2, spacing among groups

| Focal length | d1 | d2 | d3 |
|---|---|---|---|
| 6.71 | 12.65 | 6.08 | 4.37 |
| 11.28 | 5.94 | 11.71 | 3.54 |
| 18.96 | 1.57 | 19.65 | 3.28 |

EXAMPLE 3

Figure 5:
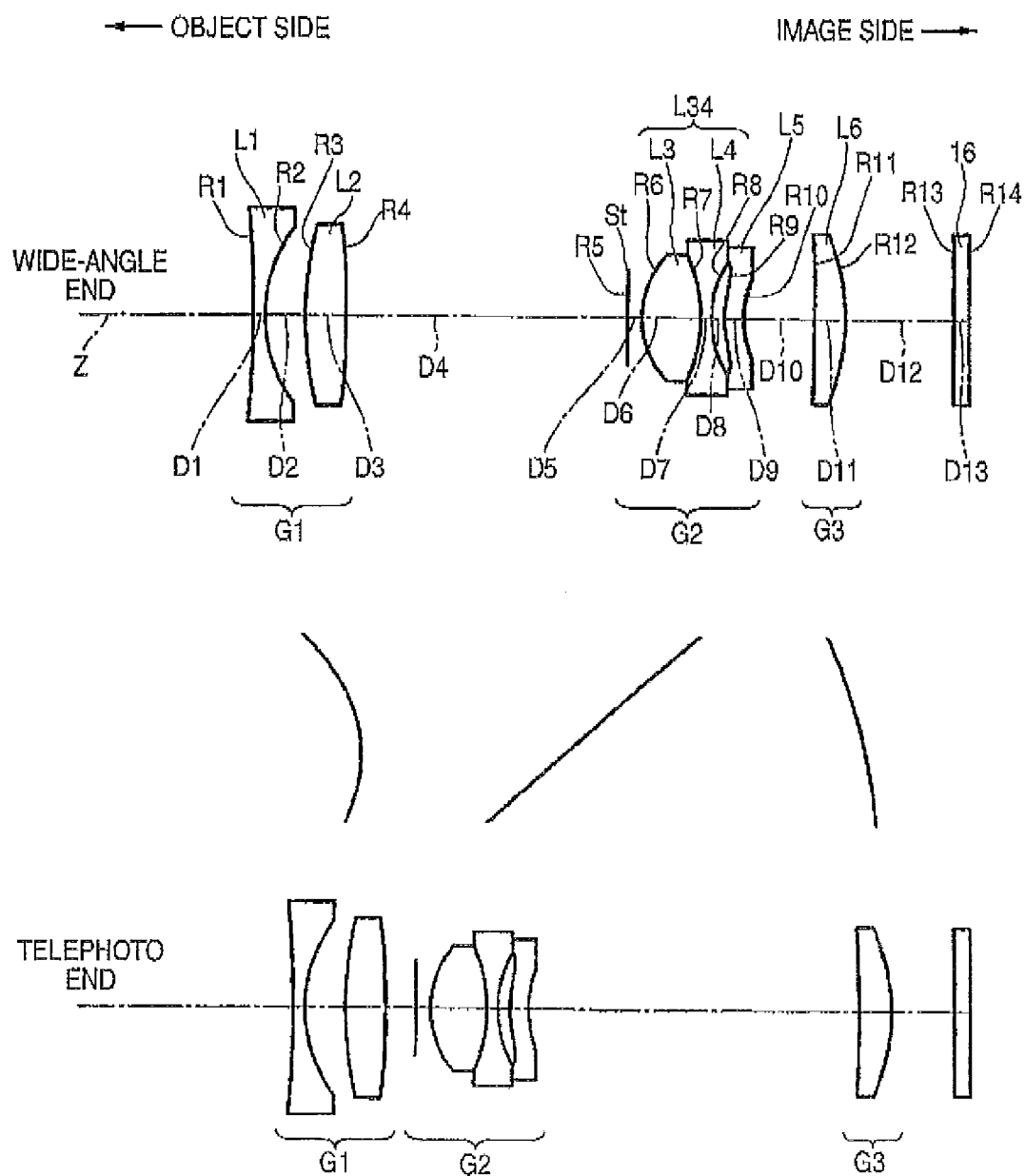
FIG. 5 is a cross-sectional profile showing a lens configuration of a three-group zoom lens of Example 3 of the present invention.

Table 7 shows values of specifications of a three-group zoom lens of Example 3; Table 8 shows coefficients for an aspherical equation in connection with respective aspherical surfaces; and Table 9 shows spacing among groups achieved at the time of variation of power. FIG. 5 shows a lens configuration diagram of a three-group zoom lens of Example 3; and FIG. 6 shows aberration diagrams. In FIG. 5, reference symbols Ri and Di correspond to Ri and Di in Table 7.

TABLE 7

Example 3
f = 6.84~19.35, FNo. = 3.0~5.5, 2ω = 59.6~21.6

| Si | Ri | Di | Ndj | vdj |
|---|---|---|---|---|
| 1 | −65.1937 | 0.60 | 1.72916 | 54.7 |
| 2 | 7.8857 | 2.11 | | |
| 3* | 20.0838 | 2.13 | 1.60595 | 27.0 |
| 4* | −94.8375 | Change d1 | | |
| 5 (aperture diaphragm) | ∞ | 0.75 | | |
| 6 | 5.1213 | 3.00 | 1.77250 | 49.6 |
| 7 | −8.2458 | 0.56 | 1.69895 | 30.1 |
| 8 | 6.0870 | 0.65 | | |
| 9* | 5.8606 | 1.00 | 1.50957 | 56.5 |
| 10* | 5.5000 | Change d2 | | |

TABLE 7-continued

Example 3
f = 6.84~19.35, FNo. = 3.0~5.5, 2ω = 59.6~21.6

| Si | Ri | Di | Ndj | vdj |
|---|---|---|---|---|
| 11* | −109.7500 | 1.67 | 1.50957 | 56.5 |
| 12* | −11.1740 | Change d3 | | |
| 13 | ∞ | 0.80 | 1.51680 | 64.2 |
| 14 (image plane) | ∞ | 0 | | |

TABLE 8

Example 3, aspherical coefficients

| Si | KA | A3 | A4 | A5 | A6 |
|---|---|---|---|---|---|
| 3 | −0.8429784 | 8.6563597E−04 | −1.0002856E−03 | 6.1324397E−04 | −1.7956531E−04 |
| 4 | −0.0121626 | 1.7858818E−04 | −1.4932994E−04 | −2.9426655E−04 | 2.6085492E−04 |
| 9 | −0.1153729 | −5.8780885E−03 | 4.8430603E−03 | −5.0875377E−03 | 9.9738836E−04 |
| 10 | −10.3407011 | −6.5575972E−03 | 1.8023818E−02 | −7.7456548E−03 | 1.1317023E−03 |

| Si | A7 | A8 | A9 | A10 | A11 |
|---|---|---|---|---|---|
| 3 | 1.5707756E−05 | 1.3358923E−06 | −6.4424747E−08 | 9.3422960E−09 | −6.6151045E−09 |
| 4 | −1.0635525E−04 | 1.5252041E−05 | 8.0814146E−07 | −1.7986423E−07 | −4.2436631E−08 |
| 9 | −5.2915155E−05 | −2.1123700E−05 | −1.9105180E−06 | −1.3369815E−07 | −1.3237533E−08 |
| 10 | 1.8376070E−06 | −2.2702657E−06 | 1.1788451E−08 | −5.1297666E−08 | −3.7008808E−09 |

| Si | A12 | A13 | A14 | A15 | A16 |
|---|---|---|---|---|---|
| 3 | 3.2022742E−10 | −5.4392926E−11 | −5.9929780E−13 | −2.2615785E−14 | 7.6954759E−16 |
| 4 | 5.1486127E−09 | −1.1593182E−11 | 1.2275416E−11 | 8.5763800E−14 | 7.9632073E−15 |
| 9 | −3.2805427E−09 | | | | |
| 10 | −3.1383622E−09 | | | | |

| Si | A17 | A18 | A19 | A20 |
|---|---|---|---|---|
| 3 | −5.5200063E−16 | 3.1665426E−16 | 3.2946898E−18 | −4.3175346E−18 |
| 4 | 2.0633582E−15 | 8.0246374E−18 | 1.1611680E−17 | 2.0756777E−18 |

| Si | KA | A4 | A6 | A8 | A10 |
|---|---|---|---|---|---|
| 11 | 0.9996649 | −5.2525596E−05 | 1.0714962E−06 | −1.2515379E−10 | −1.7936117E−14 |
| 12 | 2.0151092 | 2.4590403E−04 | −1.3652421E−06 | 9.9232428E−11 | 1.8153344E−14 |

TABLE 9

Example 3, spacing among groups

| Focal length | d1 | d2 | d3 |
|---|---|---|---|
| 6.84 | 15.02 | 3.71 | 5.77 |
| 11.50 | 7.32 | 10.19 | 3.89 |
| 19.33 | 1.59 | 17.33 | 3.31 |

EXAMPLE 4

Figure 7:
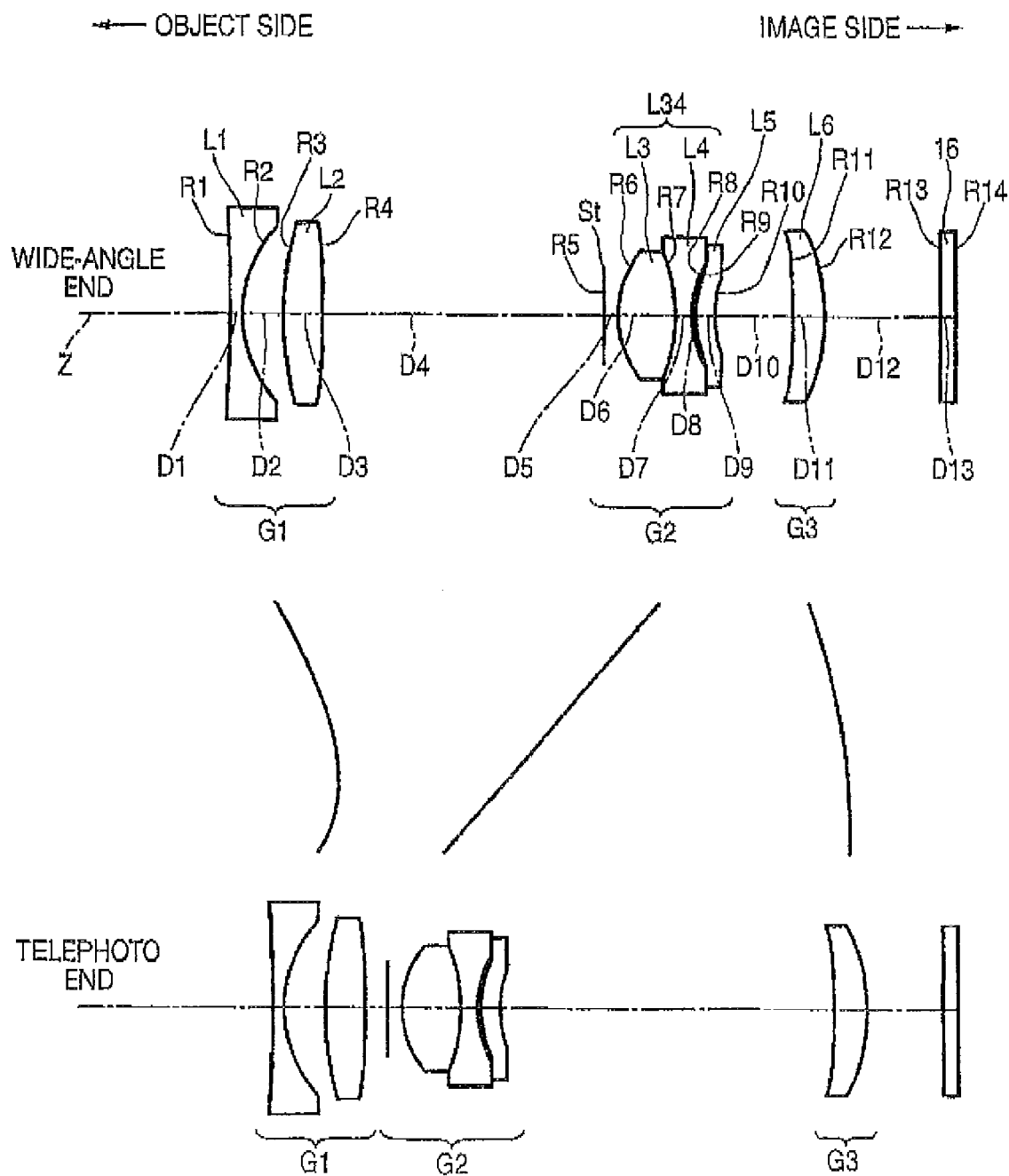
FIG. 7 is a cross-sectional profile showing a lens configuration of a three-group zoom lens of Example 4 of the present invention.

Table 10 shows values of specifications of a three-group zoom lens of Example 4; Table 11 shows coefficients for an aspherical equation in connection with respective aspherical surfaces; and Table 12 shows spacing among groups achieved at the time of variation of power. FIG. 7 shows a lens configuration diagram of a three-group zoom lens of Example 4; and FIG. 8 shows aberration diagrams. In FIG. 7, reference symbols Ri and Di correspond to Ri and Di in Table 10.

TABLE 10

Example 4
f = 6.83~19.31, FNo. = 3.1~5.5, 2ω = 59.8~21.6

| Si | Ri | Di | Ndj | νdj |
|---|---|---|---|---|
| 1 | −94.9303 | 0.60 | 1.71300 | 53.9 |
| 2 | 6.932 | 2.14 | | |
| 3* | 18.48 | 2.05 | 1.60595 | 27.0 |
| 4* | −99.9003 | Change d1 | | |
| 5 (aperture diaphragm) | ∞ | 0.75 | | |
| 6 | 5.4213 | 2.99 | 1.77250 | 49.6 |
| 7 | −9.0529 | 0.86 | 1.69895 | 30.1 |
| 8 | 5.7923 | 0.19 | | |
| 9* | 5.5586 | 1.00 | 1.50957 | 56.5 |
| 10* | 6.873 | Change d2 | | |
| 11* | −49.9908 | 1.67 | 1.50957 | 56.5 |
| 12* | −11.3944 | Change d3 | | |
| 13 | ∞ | 0.80 | 1.51680 | 64.2 |
| 14 (image plane) | ∞ | 0.00 | | |

TABLE 11

Example 4, aspherical coefficients

| Si | KA | A3 | A4 | A5 | A6 |
|---|---|---|---|---|---|
| 3 | −0.1382296 | −6.7867693E−04 | 1.4900783E−03 | −1.1984528E−03 | 4.9337554E−04 |
| 4 | −0.0092225 | −1.1615823E−03 | 2.1103847E−03 | −2.1077614E−03 | 1.0039726E−03 |
| 9 | −1.1147927 | −3.2314672E−03 | 6.2225379E−03 | −4.3546074E−03 | 1.2523511E−03 |
| 10 | −18.6431741 | −3.0542946E−03 | 1.6399224E−02 | −6.3028439E−03 | 1.4266494E−03 |

TABLE 11-continued

Example 4, aspherical coefficients

| Si | A7 | A8 | A9 | A10 | A11 |
|---|---|---|---|---|---|
| 3 | −8.4879059E−05 | −1.6054368E−07 | 9.2604041E−07 | 1.4642951E−07 | −1.5173393E−08 |
| 4 | −2.4226041E−04 | 1.9004922E−05 | 2.1069630E−06 | −1.3795516E−07 | −5.9936818E−08 |
| 9 | −8.2803123E−05 | −3.3521854E−05 | −2.7103645E−06 | −2.9861490E−07 | 2.1840191E−07 |
| 10 | −1.1233540E−04 | −1.2694050E−05 | −1.1697448E−06 | 1.3993423E−06 | −9.4453447E−07 |

| Si | A12 | A13 | A14 |
|---|---|---|---|
| 3 | −2.4338126E−09 | −7.7504036E−12 | −1.6419010E−12 |
| 4 | 4.0647332E−09 | 6.9337749E−11 | 1.0051234E−11 |
| 9 | −1.0322825E−07 | | |
| 10 | 1.4859949E−07 | | |

| Si | KA | A4 | A6 | A8 | A10 |
|---|---|---|---|---|---|
| 11 | −0.0001533 | −2.5482156E−04 | −1.0428637E−05 | −5.5748424E−08 | −4.9509526E−09 |
| 12 | 1.6500512 | 1.0286640E−04 | −1.9004361E−05 | −7.2257302E−08 | 6.1328235E−09 |

TABLE 12

Example 4, spacing among groups

| Focal length | d1 | d2 | d3 |
|---|---|---|---|
| 6.828 | 14.709 | 4.019 | 6.026 |
| 11.481 | 6.539 | 9.764 | 4.776 |
| 19.307 | 1.230 | 17.317 | 3.967 |

EXAMPLE 5

Figure 9:
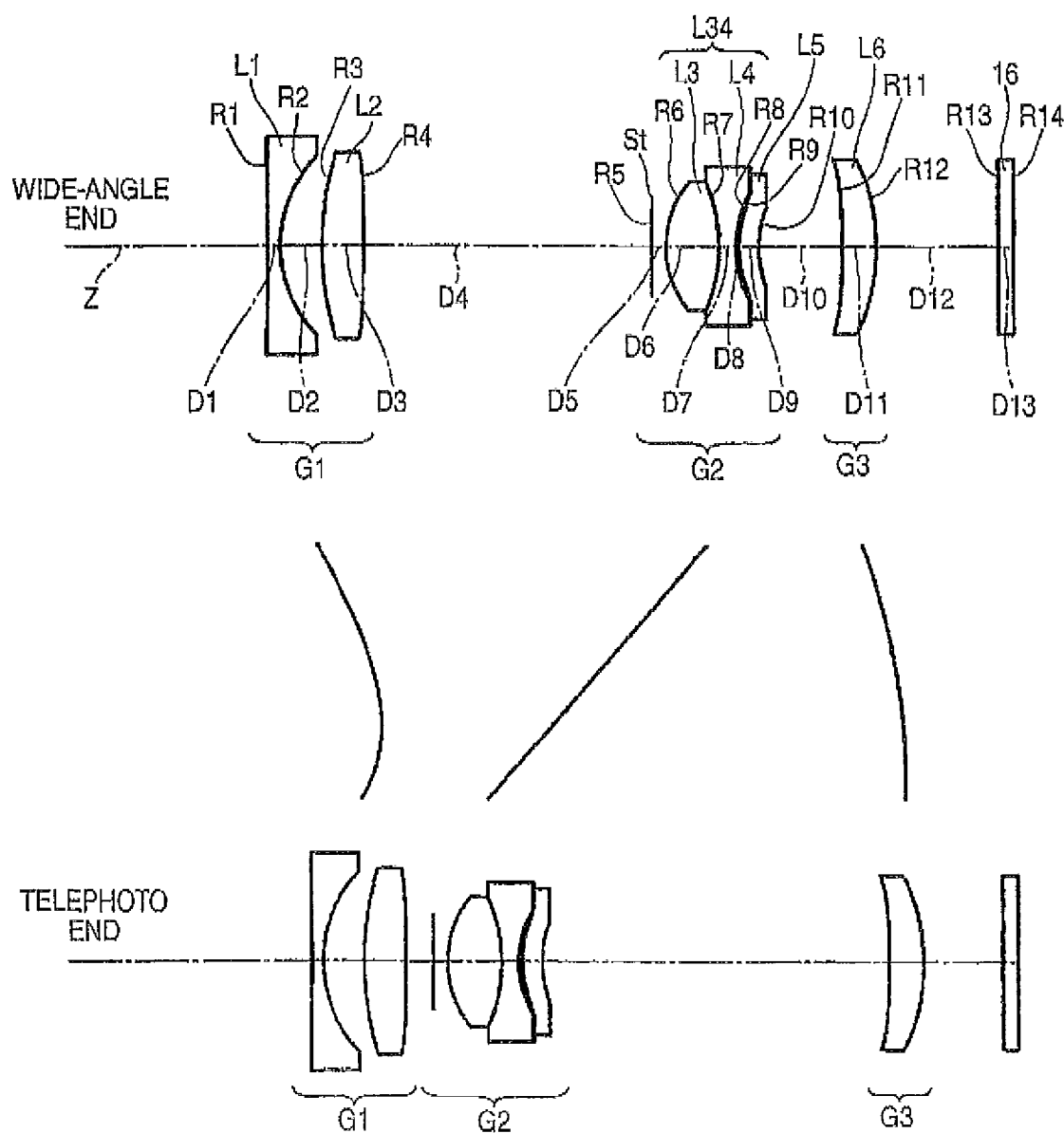
FIG. 9 is a cross-sectional profile showing a lens configuration of a three-group zoom lens of Example 5 of the present invention.
Figure 10:
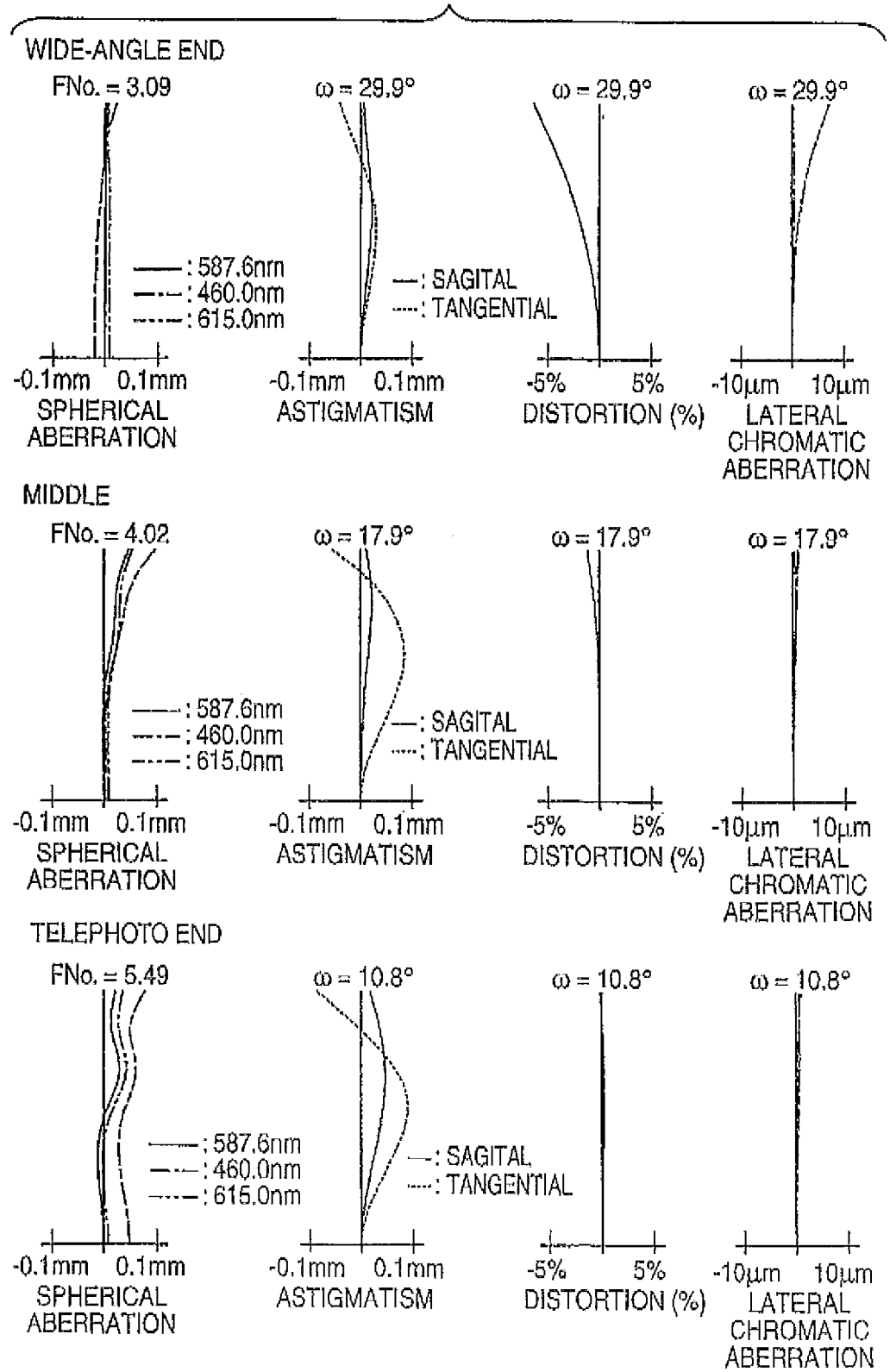
FIG. 10 is aberration diagrams of the three-group zoom lens of Example 5 of the present invention.

Table 13 shows values of specifications of a three-group zoom lens of Example 5; Table 14 shows coefficients for an aspherical equation in connection with respective aspherical surfaces; and Table 15 shows spacing among groups achieved at the time of variation of power. FIG. 9 shows a lens configuration diagram of a three-group zoom lens of Example 5; and FIG. 10 shows aberration diagrams. In FIG. 9, reference symbols Ri and Di correspond to Ri and Di in Table 13.

TABLE 13

Example 5
f = 6.83~19.32, FNo. = 3.1~5.5, 2ω = 59.8~21.6

| Si | Ri | Di | Ndj | vdj |
|---|---|---|---|---|
| 1 | −573.1427 | 0.60 | 1.75500 | 52.3 |
| 2 | 6.8863 | 2.09 | | |
| 3* | 16.7087 | 2.12 | 1.60779 | 25.2 |
| 4* | −323.7049 | Change d1 | | |
| 5 (aperture diaphragm) | ∞ | 0.75 | | |
| 6 | 5.2868 | 2.73 | 1.75500 | 52.3 |
| 7 | −8.6842 | 0.86 | 1.67270 | 32.1 |
| 8 | 5.6333 | 0.18 | | |
| 9* | 5.5000 | 1.00 | 1.50957 | 56.5 |
| 10* | 6.7835 | Change d2 | | |
| 11* | −43.9699 | 1.67 | 1.50957 | 56.5 |
| 12* | −11.7877 | Change d3 | | |
| 13 | ∞ | 0.80 | 1.51680 | 64.2 |
| 14 (image plane) | ∞ | 0.00 | | |

TABLE 14

Example 5, aspherical coefficients

| Si | KA | A3 | A4 | A5 | A6 |
|---|---|---|---|---|---|
| 3 | −0.5344182 | −7.8438679E−04 | 1.5653621E−03 | −1.2331344E−03 | 5.0145298E−04 |
| 4 | −0.0079096 | −1.2470975E−03 | 2.1419351E−03 | −2.1172436E−03 | 1.0025646E−03 |
| 9 | −0.5290734 | −2.8642276E−03 | 5.5603424E−03 | −4.2179864E−03 | 1.2439306E−03 |
| 10 | −18.3651457 | −2.6417368E−03 | 1.6365890E−02 | −6.2402249E−03 | 1.4267580E−03 |

| Si | A7 | A8 | A9 | A10 | A11 |
|---|---|---|---|---|---|
| 3 | −8.5880534E−05 | −1.5542520E−07 | 9.3077885E−07 | 1.4652916E−07 | −1.5157804E−08 |
| 4 | −2.4173558E−04 | 1.8987139E−05 | 2.1014081E−06 | −1.3805202E−07 | −5.9951252E−03 |
| 9 | −8.4033175E−05 | −3.3531052E−05 | −2.7108677E−06 | −2.9861683E−07 | 2.1840209E−07 |
| 10 | −1.1189148E−04 | −1.2690077E−05 | −1.1695708E−06 | 1.3993436E−06 | −9.4453408E−07 |

| Si | A12 | A13 | A14 |
|---|---|---|---|
| 3 | −2.4336893E−09 | −7.7592237E−12 | −1.6417697E−12 |
| 4 | 4.0645310E−09 | 6.9318177E−11 | 1.0051052E−11 |

TABLE 14-continued

Example 5, aspherical coefficients

| | | | | | |
|---|---|---|---|---|---|
| 9 | −1.0322825E−07 | | | | |
| 10 | 1.4859949E−07 | | | | |

| Si | KA | A4 | A6 | A8 | A10 |
|---|---|---|---|---|---|
| 11 | −0.0055688 | −2.4330345E−04 | −1.0382855E−05 | −2.3663470E−08 | −4.9034335E−09 |
| 12 | 1.7043364 | 9.6784816E−05 | −1.8664744E−05 | −5.1373111E−08 | 6.1168611E−09 |

TABLE 15

Example 5, spacing among groups

| Focal length | d1 | d2 | d3 |
|---|---|---|---|
| 6.83 | 14.71 | 4.18 | 6.11 |
| 11.49 | 6.58 | 9.83 | 4.92 |
| 19.32 | 1.42 | 17.53 | 3.97 |

EXAMPLE 6

Figure 11:
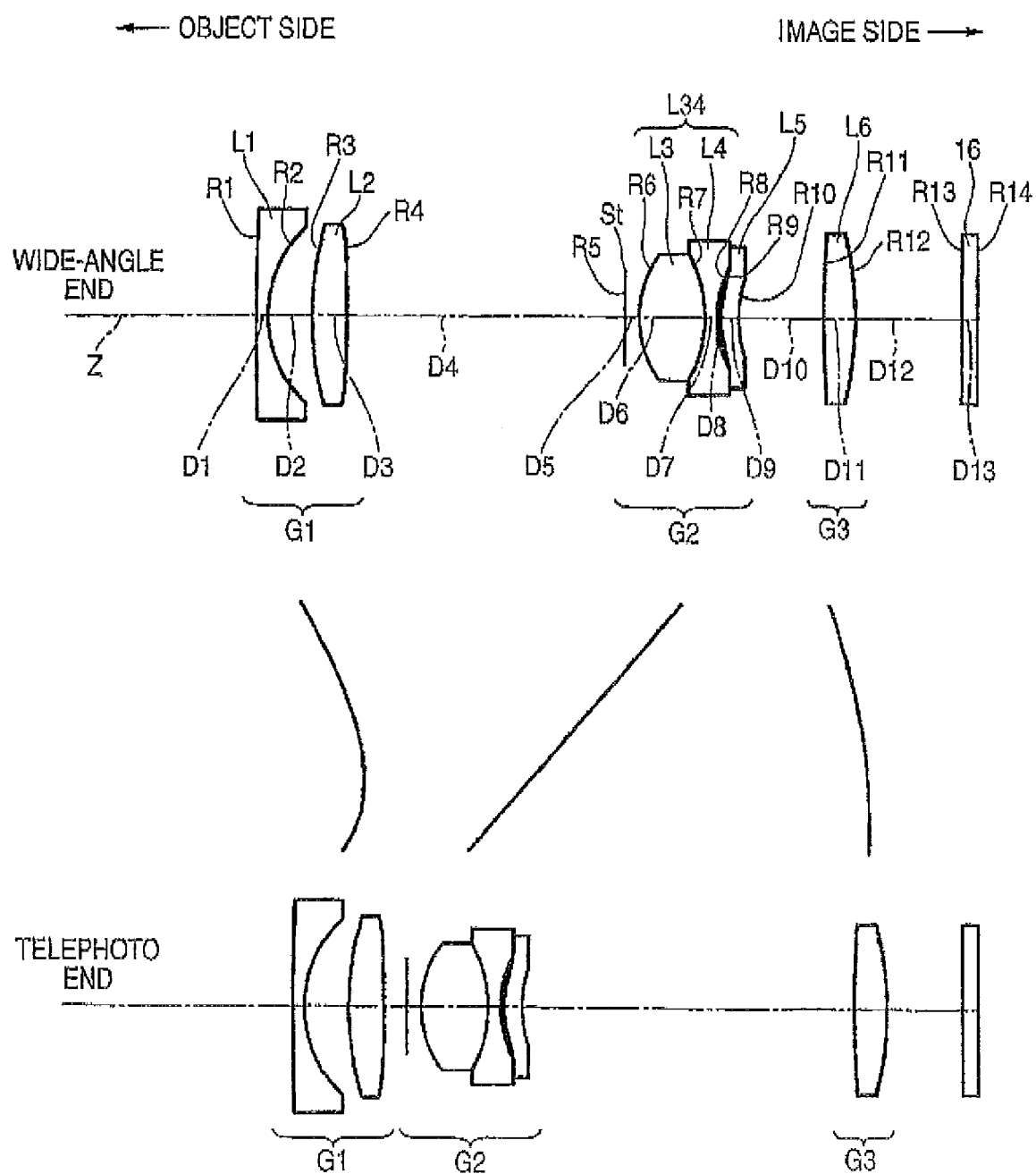
FIG. 11 is a cross-sectional profile showing a lens configuration of a three-group zoom lens of Example 6 of the present invention.
Figure 12:
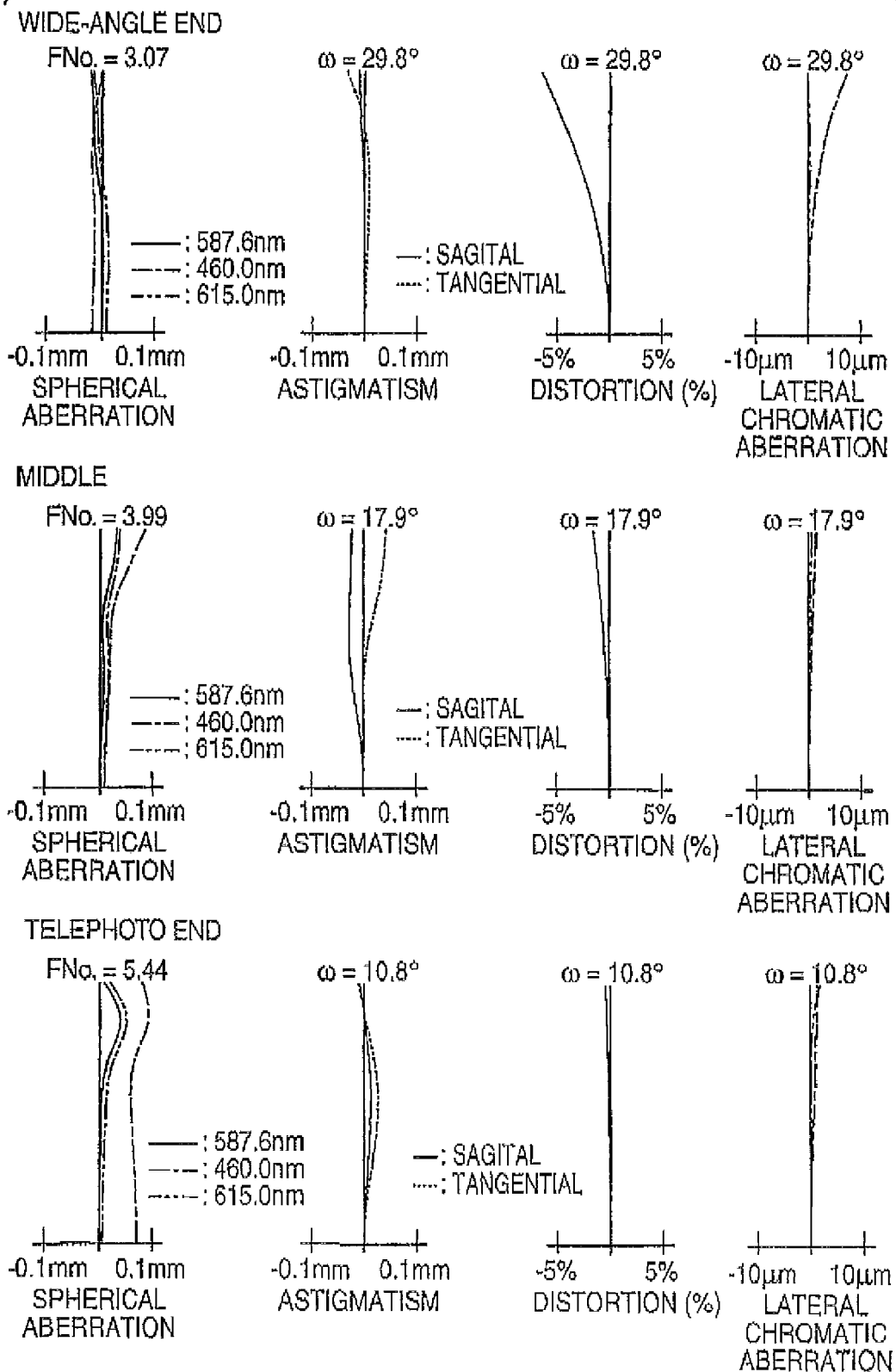
FIG. 12 is aberration diagrams of the three-group zoom lens of Example 6 of the present invention.

Table 16 shows values of specifications of a three-group zoom lens of Example 6; Table 17 shows coefficients for an aspherical equation in connection with respective aspherical surfaces; and Table 18 shows spacing among groups achieved at the time of variation of power. FIG. 11 shows a lens configuration diagram of a three-group zoom lens of Example 6; and FIG. 12 shows aberration diagrams. In FIG. 11, reference symbols Ri and Di correspond to Ri and Di in Table 16.

TABLE 16

Example 6
$f = 6.84\sim19.34$, FNo. = 3.1~5.4, $2\omega = 59.6\sim21.6$

| Si | Ri | Di | Ndj | vdj |
|---|---|---|---|---|
| 1 | 190.6406 | 0.60 | 1.72916 | 54.7 |
| 2 | 6.4768 | 2.30 | | |
| 3* | 17.138 | 1.80 | 1.60595 | 27.0 |
| 4* | −468.955 | Change d1 | | |

TABLE 16-continued

Example 6
$f = 6.84\sim19.34$, FNo. = 3.1~5.4, $2\omega = 59.6\sim21.6$

| Si | Ri | Di | Ndj | vdj |
|---|---|---|---|---|
| 5 (aperture diaphragm) | ∞ | 0.75 | | |
| 6 | 5.5925 | 3.52 | 1.75500 | 52.3 |
| 7 | −6.9178 | 0.66 | 1.67270 | 32.1 |
| 8 | 6.179 | 0.20 | | |
| 9* | 5.8102 | 0.95 | 1.50957 | 56.5 |
| 10* | 6.7488 | Change d2 | | |
| 11 | 59.7154 | 1.66 | 1.50957 | 56.5 |
| 12 | −20.1377 | Change d3 | | |
| 13 | ∞ | 0.80 | 1.51680 | 64.2 |
| 14 (image plane) | ∞ | 0.00 | | |

TABLE 17

Example 6, aspherical coefficients

| Si | KA | A3 | A4 | A5 | A6 |
|---|---|---|---|---|---|
| 3 | 0.8796105 | −8.4272221E−04 | 1.6636460E−03 | −1.2361451E−03 | 4.9995601E−04 |
| 4 | −0.0136145 | −1.3852223E−03 | 2.3258890E−03 | −2.2180528E−03 | 1.0189926E−03 |
| 9 | −0.0113311 | −2.6835406E−03 | 1.9301562E−03 | −1.2220252E−03 | −9.1894272E−05 |
| 10 | 4.1747806 | −2.4301499E−03 | 3.1374254E−03 | −1.3514997E−03 | −2.8295996E−05 |

| Si | A7 | A8 | A9 | A10 | A11 |
|---|---|---|---|---|---|
| 3 | −8.4437325E−05 | −1.5335565E−07 | 9.2552379E−07 | 1.4639216E−07 | −1.5183261E−08 |
| 4 | −2.4297693E−04 | 1.8994798E−05 | 2.1106089E−06 | −1.3783880E−07 | −5.9916673E−08 |
| 9 | −1.2324106E−05 | −9.3557688E−08 | −5.2108175E−09 | −2.7919542E−11 | −1.2530334E−12 |
| 10 | −1.9371384E−06 | −7.0336493E−09 | −1.3662537E−10 | 1.2459680E−12 | −3.8255420E−16 |

| Si | A12 | A13 | A14 |
|---|---|---|---|
| 3 | −2.4340824E−09 | −7.8071210E−12 | −1.6427577E−12 |
| 4 | 4.0648415E−09 | 6.9331766E−11 | 1.0051424E−11 |
| 9 | −9.1359365E−15 | | |
| 10 | 2.3902578E−15 | | |

TABLE 18

Example 6, spacing among groups

| Focal length | d1 | d2 | d3 |
|---|---|---|---|
| 6.84 | 14.67 | 4.39 | 5.54 |
| 11.50 | 6.42 | 9.87 | 4.55 |
| 19.34 | 1.18 | 17.40 | 3.96 |

EXAMPLE 7

Figure 13:
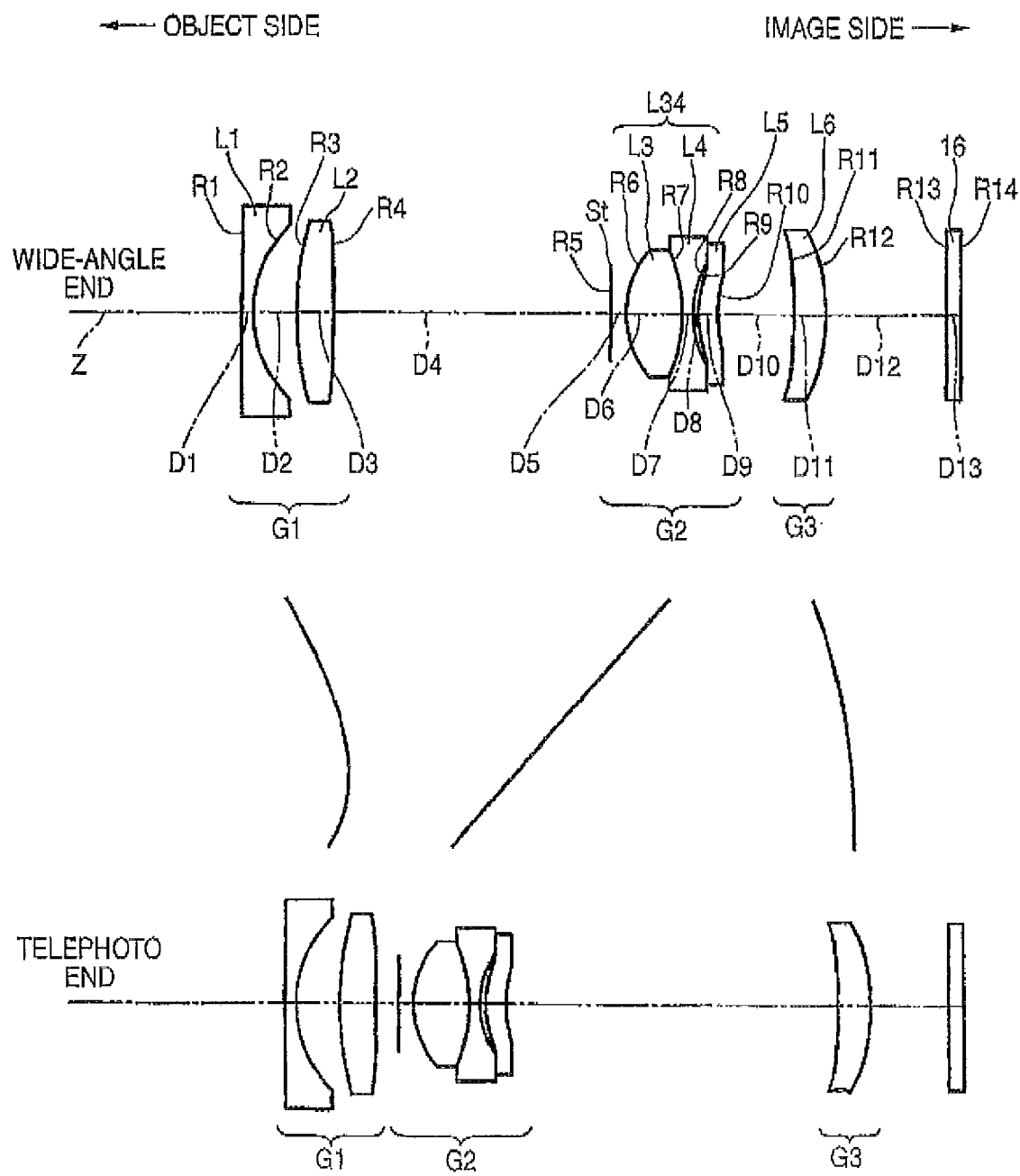
FIG. 13 is a cross-sectional profile showing a lens configuration of a three-group zoom lens of Example 7 of the present invention.

Table 19 shows values of specifications of a three-group zoom lens of Example 7; Table 20 shows coefficients for an aspherical equation in connection with respective aspherical surfaces; and Table 21 shows spacing among groups achieved at the time of variation of power. FIG. 13 shows a lens configuration diagram of a three-group zoom lens of Example 7; and FIG. 14 shows aberration diagrams. In FIG. 13, reference symbols Ri and Di correspond to Ri and Di in Table 19.

TABLE 19

Example 7
$f = 6.83 \sim 19.32$, FNo. $= 3.1 \sim 5.5$, $2\omega = 59.8 \sim 21.6$

| Si | Ri | Di | Ndj | vdj |
|---|---|---|---|---|
| 1 | 266.5924 | 0.60 | 1.72916 | 54.7 |
| 2 | 6.6174 | 2.29 | | |
| 3* | 18.0112 | 1.92 | 1.60779 | 25.2 |
| 4* | −833.335 | Change d1 | | |
| 5 (aperture diaphragm) | ∞ | 0.75 | | |
| 6 | 5.141 | 2.98 | 1.72916 | 54.7 |
| 7 | −8.1941 | 0.56 | 1.64769 | 33.8 |
| 8 | 5.0978 | 0.30 | | |
| 9* | 5.4999 | 1.05 | 1.50957 | 56.5 |
| 10* | 8.0785 | Change d2 | | |
| 11* | −46.7045 | 1.68 | 1.50957 | 56.5 |
| 12* | −12.8651 | Change d3 | | |
| 13 | ∞ | 0.80 | 1.5168 | 64.2 |
| 14 (image plane) | ∞ | 0.00 | | |

TABLE 21

Example 7, spacing among groups

| Focal length | d1 | d2 | d3 |
|---|---|---|---|
| 6.83 | 14.59 | 4.05 | 6.22 |
| 11.49 | 6.29 | 9.47 | 5.19 |
| 19.32 | 1.20 | 17.37 | 3.99 |

Next, Table 22 shows values corresponding to conditional expressions (1) to (8) in connection with the three-group zoom lenses of Examples 1 to 7. As can be seen from Table 22, each of Examples 1 to 7 satisfies all of the conditional expressions (1) through (8).

TABLE 20

Example 7, aspherical coefficients

| Si | KA | A3 | A4 | A5 | A6 |
|---|---|---|---|---|---|
| 3 | −1.6755579 | −8.4841531E−04 | 1.6426543E−03 | −1.2573572E−03 | 5.0400884E−04 |
| 4 | −0.0080773 | −1.2795470E−03 | 2.1795731E−03 | −2.1445314E−03 | 1.0089728E−03 |
| 9 | −1.9472077 | −3.4389108E−03 | 6.5936628E−03 | −4.6282030E−03 | 1.2404967E−03 |
| 10 | −22.1186275 | −3.4400872E−03 | 1.3784717E−02 | −6.0539072E−03 | 1.4338199E−03 |

| Si | A7 | A8 | A9 | A10 | A11 |
|---|---|---|---|---|---|
| 3 | −8.5467001E−05 | −1.8066173E−07 | 9.2448334E−07 | 1.4643345E−07 | −1.5170460E−08 |
| 4 | −2.4209570E−04 | 1.8969626E−05 | 2.0985771E−06 | −1.3809195E−07 | −5.9956627E−08 |
| 9 | −8.4418885E−05 | −3.3534248E−05 | −2.7110555E−06 | −2.9861801E−07 | 2.1840206E−07 |
| 10 | −1.1125254E−04 | −1.2685098E−05 | −1.1692808E−06 | 1.3993452E−06 | −9.4453398E−07 |

| Si | A12 | A13 | A14 |
|---|---|---|---|
| 3 | −2.4338136E−09 | −7.7660766E−12 | −1.6418301E−12 |
| 4 | 4.0644720E−09 | 6.9316354E−11 | 1.0051050E−11 |
| 9 | −1.0322825E−07 | | |
| 10 | 1.4859949E−07 | | |

| Si | KA | A4 | A6 | A8 | A10 |
|---|---|---|---|---|---|
| 11 | −0.0081069 | −4.0330536E−04 | −1.1191611E−05 | −8.3875017E−08 | −4.9630218E−09 |
| 12 | 0.1515686 | −1.6061340E−04 | −2.1622437E−05 | −3.1644342E−08 | 6.1565738E−09 |

TABLE 22

| Conditional Expression | Example 1 | Example 2 | Example 3 | Example 4 | Example 5 | Example 6 | Example 7 |
|---|---|---|---|---|---|---|---|
| (1) $fg_2/fw$ | 3.96 | 3.48 | 4.03 | 3.79 | 3.84 | 3.99 | 4.25 |
| (2) $v_1 - v_2$ | 27.7 | 27.7 | 27.7 | 26.9 | 27.1 | 27.7 | 29.5 |
| (3) $D_1/fw$ | 0.70 | 0.71 | 0.71 | 0.70 | 0.70 | 0.69 | 0.70 |
| (4) $Nd_2$ | 1.60595 | 1.60595 | 1.60595 | 1.60595 | 1.60779 | 1.60595 | 1.60779 |
| (5) $v_2$ | 27.0 | 27.0 | 27.0 | 27.0 | 25.2 | 27.0 | 25.2 |
| (6) $D_2/fw$ | 0.79 | 0.80 | 0.76 | 0.74 | 0.70 | 0.78 | 0.72 |
| (7), (8) $f_3/fw$ | 3.64 | 3.58 | 3.55 | 4.18 | 4.55 | 4.35 | 5.02 |

Figure 15A:
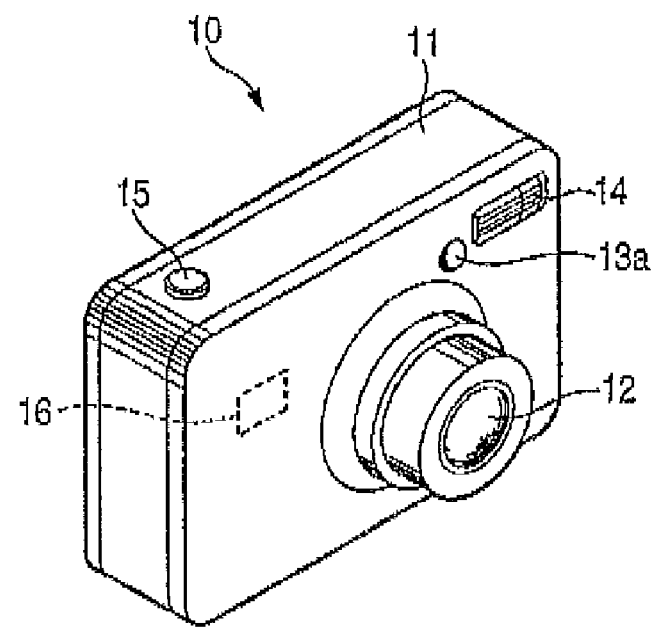
FIG. 15A is a front perspective view of a digital camera of an embodiment of the present invention.

Next, an embodiment of the imaging device of the present invention will be described. FIG. 15A is a front perspective view of a digital camera 10 which is an embodiment of the imaging device of the present invention, and FIG. 15D is a rear perspective view of the same.

As shown in FIG. 15A, the front of a camera body 11 of the digital camera 10 is equipped with a three-group zoom lens 12 which is an embodiment of the present invention; an objective window 13a of a finder; and a flashlight firing device 14 for firing flash light to a subject. A shutter button 15 is provided on an upper surface of the camera body 11, and an imaging element 16, such as a CCD and a CMOS, for capturing an image of a subject formed by the three-group zoom lens 12 is provided in the camera body 11.

Figure 15B:
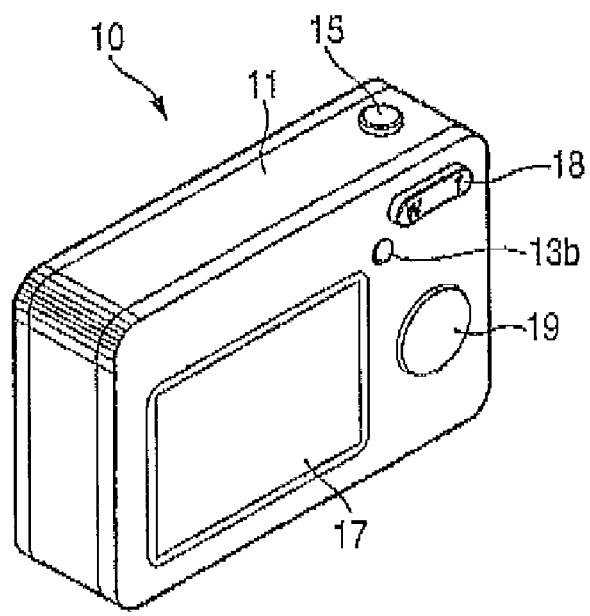
FIG. 15B is a rear perspective view of the digital camera of the embodiment of the present invention.

As shown in FIG. 15B, the rear surface of the camera body 11 is equipped with an LCD (Liquid-Crystal Display) 17 for displaying an image and various setting screens; an observation window 13b of the finder; a zoom lever 18 for varying power of the three-group zoom lens 12; and an operation button 19 for performing various settings. The digital camera 10 is configured such that light of the sub; eat guided by way of the objective window 13a or the finder can be visually ascertained by means of the observation window 13b of the finder.

Figure 16:
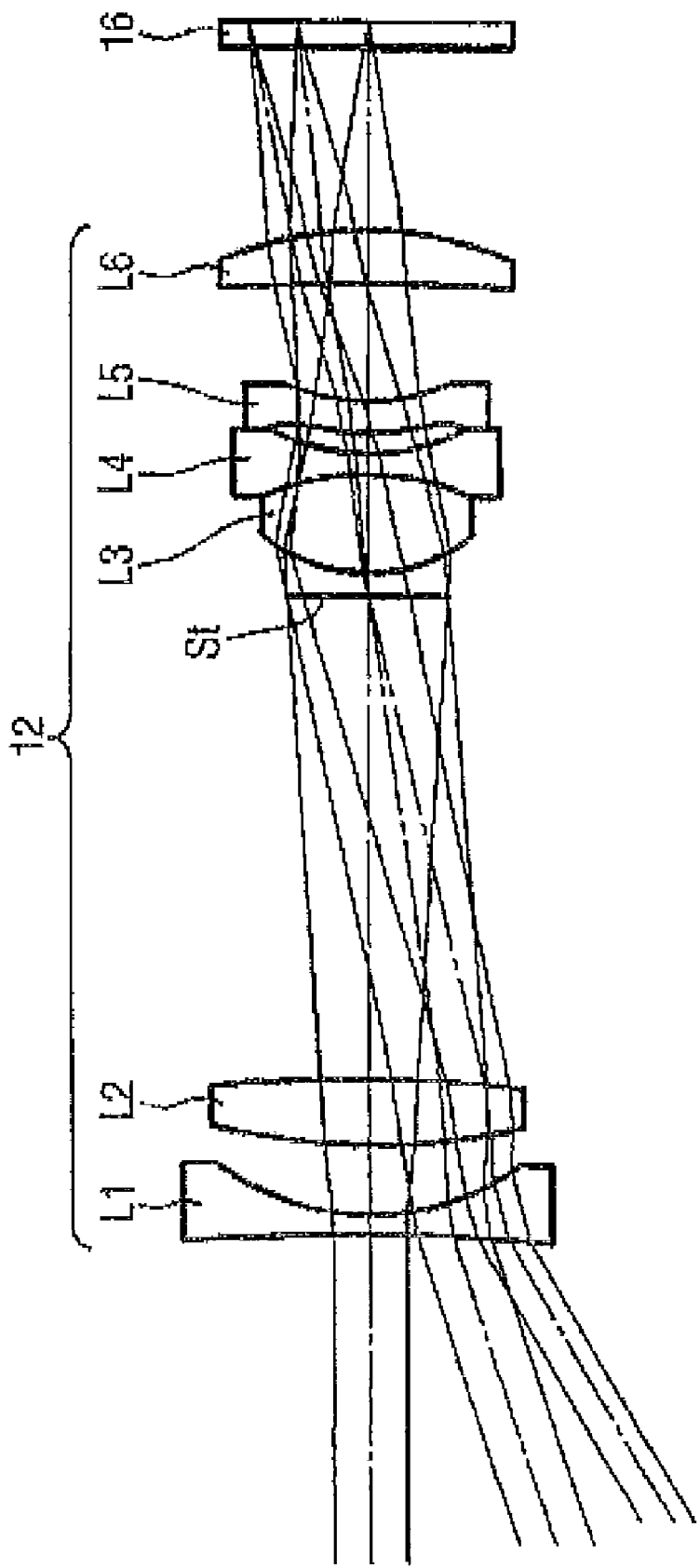
FIG. 16 shows a cross-sectional profile of an imaging optical system of an embodiment of the present invention, showing an optical path of light entered the imaging optical system.

FIG. 16 shows an optical path along which the light incident on the three-group zoom lens 12 reaches the imaging element 16 arranged at an imago plane of the zoom lens. As shown in FIG. 16, light of the subject entered the three-group zoom lens 12 is guided to the imaging element 16 by means of the lenses L1 through L6 constituting the three-group zoom lens, and a clear image is formed on the imaging surface of the imaging element 16.

The three-group zoom lens 12 is arranged in such a way that the direction of the optical axis of the zoom lens coincides with the thicknesswise direction of the camera body 11. As mentioned above, since the three-group zoom lens 12 of the present embodiment is intended to be miniaturized, the entire length of the optical system achieved in the direction of the optical axis thereof when the three-group zoom lens 12 is retractably housed in the camera main body 11 becomes shorter, and the thickness of the digital camera 10 can be reduced.

The present invention has been described by reference to embodiments and examples of the present invention. However, the present invention is not limited to the embodiments and the examples mentioned above and is susceptible to various modifications. For instance, the curvature radius, the on-axis surface spacing, and the refractive index of the respective lens components are not limited to the values provided in the respective numerical examples mentioned above and may assume other values.

For instance, Example 1 shows a configuration where the second lens L2, the fifth lens L5, and the sixth lens L6 are formed from a plastic material. The fifth lens L5 and the sixth lens L6 are not limited to a plastic material and can also be formed from a glass material.

The embodiments have been described by means of taking the digital camera as an example of the imaging device. However, the present invention is not limited to the digital camera. The present invention can also be applied to another imaging device; for example, a video camera and the like.

According to the three-group zoom lens of the present invention, an attempt can be made to further reduce cost by means of forming the second lens from an aspherical plastic lens. The entire length of the lens system achieved when the zoom lens is retractably housed is shortened by means of fulfilling the conditional expression (3), thereby accomplishing miniaturization. Shapes and optical materials for the respective lenses are appropriately selected, and the conditional expressions (1) and (2) are fulfilled, thereby well correcting various aberrations and ensuring high optical performance. Further, since the imaging device of the present invention is equipped with the three-group zoom lens of the present invention, a superior optical image can be acquired, and miniaturization and cost reduction can be accomplished.

The entire disclosure of each and every foreign patent application from which the benefit of foreign priority has been claimed in the present application is incorporated herein by reference, as if fully set forth.

What is claimed is:

1. A three-group zoom lens comprising, in order from an object side:

a first lens group having a negative refractive power;

a second lens group having a positive refractive power; and a third lens group having a positive refractive power, wherein the three-group zoom lens varies power by changing spacing among the respective lens groups, wherein the first lens group comprises:

a first lens having a negative refractive power; and a second lens that is formed from a plastic material, has a biconvex shape, has at least one surface of an aspherical shape and has a positive refractive power, wherein the second lens group comprises:

a cemented lens formed from a third lens having a positive refractive power and a fourth lens having a negative refractive power; and a fifth lens having a meniscus shape whose convex surface is oriented to the object side, wherein the third lens group comprises a sixth lens having a positive refractive power, and wherein conditional expressions (1) through (3) provided below are fulfilled:

$$3.2 < fg_2/fw \tag{1}$$

$$26 < v_1 - v_2 < 30 \tag{2}$$

$$D_1/fw < 0.75 \tag{3, where}$$

fg$_2$: a focal length of the second lens
fw: a focal length of the three-group zoom lens achieved at a wide-angle end
ν$_1$: Abbe number of the first lens
ν$_2$: Abbe number of the second lens
D$_1$: Axial distance from a lens surface most closely positioned to the object side to a lens surface most closely positioned to an image side in the first lens group.

2. The three-group zoom lens according to claim 1, wherein the second lens fulfills conditional expressions (4) and (5) provided below:

$$Nd_2 > 1.6 \tag{4}$$

$$\nu_2 < 30.0 \tag{5}$$

where Nd$_2$ is a refractive index of the second lens.

3. The three-group zoom lens according to claim 2, wherein the second lens group fulfills a conditional expression (6) provided below:

$$D_2/fw < 0.85 \tag{6}$$

where D$_2$ is an axial distance from a lens surface most closely positioned to the object side to a lens surface most closely positioned to the image side in the second lens group.

4. The three-group zoom lens according to claim 2, wherein the sixth lens is formed from a plastic material and fulfills a conditional expression (7) provided below:

$$3.0 < f_3/fw \tag{7}$$

where f$_3$ is a focal length of the third lens group.

5. The three-group zoom lens according to claim 2, wherein focusing is performed by means of moving only the third lens group in a direction of an optical axis, and a conditional expression (8) provided below is fulfilled:

$$f_3/fw < 5.5 \tag{8}$$

where f$_3$ is a focal length to the third lens group.

6. An imaging device comprising:
the three-group zoom lens according to claim 2; and
an imaging element that captures an image of a subject formed by means of the three-group zoom lens.

7. The three-group zoom lens according to claim 1, wherein the second lens group fulfills a conditional expression (6) provided below:

$$D_2/fw < 0.85 \tag{6}$$

where D$_2$ is an axial distance from a lens surface most closely positioned to the object side to a lens surface most closely positioned to the image side in the second lens group.

8. The three group zoom lens according to claim 1, wherein the sixth lens is formed from a plastic material and fulfills a conditional expression (7) provided below:

$$3.0 < f_3/fw \tag{7}$$

where f$_3$ is a focal length of the third lens group.

9. The three-group zoom lens according to claim 1, wherein focusing is performed by means of moving only the third lens group in a direction of an optical axis, and a conditional expression (8) provided below is fulfilled:

$$f_3/fw < 5.5 \tag{8}$$

where f$_3$ is a focal length of the third lens group.

10. An imaging device comprising:
the three-group zoom lens according to claim 1; and
an imaging element that captures an image of a subject formed by means of the three-group zoom lens.

* * * * *